(12) United States Patent
Abe et al.

(10) Patent No.: US 11,556,199 B2
(45) Date of Patent: Jan. 17, 2023

(54) DISPLAY DEVICE WITH SENSOR

(71) Applicant: Japan Display Inc., Minato-ku (JP)

(72) Inventors: Hiroyuki Abe, Minato-ku (JP);
Yoshinori Aoki, Minato-ku (JP);
Kazune Matsumura, Minato-ku (JP);
Masateru Morimoto, Minato-ku (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/739,382

(22) Filed: May 9, 2022

(65) Prior Publication Data

US 2022/0261109 A1    Aug. 18, 2022

Related U.S. Application Data

(63) Continuation of application No. 17/221,957, filed on Apr. 5, 2021, now Pat. No. 11,353,977, which is a
(Continued)

(30) Foreign Application Priority Data

Feb. 28, 2018    (JP) .............................. JP2018-035887

(51) Int. Cl.
*G06F 3/041*     (2006.01)
*G02F 1/1343*    (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/0412; G06F 3/0416; G06F 3/044; G06F 3/0443; G06F 3/0446; G06F 3/3648; G09G 2300/0426; G09G 2300/0413; G09G 2310/0281; G09G 2310/0232; G09G 3/3648; G02F 1/134309; G02F 1/13338; G02F 2201/56
See application file for complete search history.

(56) References Cited

U.S. PATENT DOCUMENTS

2016/0202829 A1    7/2016    Choi et al.
2016/0299385 A1    10/2016   Park et al.
(Continued)

*Primary Examiner* — David Tung
(74) *Attorney, Agent, or Firm* — Maier & Maier, PLLC

(57) ABSTRACT

According to an aspect, a display device with a sensor includes: a substrate including a display region and a peripheral region on a periphery of the display region; detection electrodes arranged in a row-column configuration in the display region; and detection lines coupled to the respective detection electrodes. A shape of the substrate in a plan view includes a curve of a curved portion. The detection electrodes include a first electrode and a second electrode having a shape different from that of the first electrode in a plan view. The second electrode is juxtaposed with the curved portion. The detection lines each include a first line coupled to the first electrode and a second line coupled to the second electrode. The second line passes from the display region across the peripheral region and extends to a position overlapping with the second electrode in a plan view.

8 Claims, 20 Drawing Sheets

Related U.S. Application Data continuation of application No. 17/065,945, filed on Oct. 8, 2020, now Pat. No. 11,003,273, which is a continuation of application No. 16/281,217, filed on Feb. 21, 2019, now Pat. No. 10,838,532.

(51) Int. Cl.
*G09G 3/36* (2006.01)
*G02F 1/1333* (2006.01)
*G06F 3/044* (2006.01)

(52) U.S. Cl.
CPC .......... G06F 3/0443 (2019.05); G06F 3/0446 (2019.05); *G02F 1/13338* (2013.01); *G02F 1/134309* (2013.01); *G02F 2201/56* (2013.01); *G09G 3/3648* (2013.01); *G09G 2300/0413* (2013.01); *G09G 2300/0426* (2013.01); *G09G 2310/0232* (2013.01); *G09G 2310/0281* (2013.01)

(56) References Cited

U.S. PATENT DOCUMENTS

2016/0364069 A1* 12/2016 Tsai .................. G06F 3/0412
2019/0073976 A1* 3/2019 Yeh ................ G02F 1/136286
2020/0098310 A1* 3/2020 Kim ................ H01L 27/3288

* cited by examiner

DISPLAY DEVICE WITH SENSOR

CROSS-REFERENCE TO RELATED APPLICATIONS

This application is a continuation of and claims the benefit of priority under 35 U.S.C. § 120 from U.S. application Ser. No. 17/221,957 filed Apr. 5, 2021, which is a continuation of U.S. application Ser. No. 17/065,945 filed Oct. 8, 2020 (now U.S. Pat. No. 11,003,273 issued May 11, 2021), which is a continuation of U.S. application Ser. No. 16/281,217 filed Feb. 21, 2019 (now U.S. Pat. No. 10,838,532 issued Nov. 17, 2020), which claims the benefit of priority under 35 U.S.C. § 119 from Japanese Application No. 2018-035887 filed Feb. 28, 2018, the contents of each of which are incorporated by reference herein in its entirety.

BACKGROUND

1. Technical Field

The present disclosure relates to a display device with a sensor.

2. Description of the Related Art

Touch detection devices capable of detecting an external proximity object, or so-called touch panels, have recently been attracting attention. A touch panel is mounted on or integrated with a display device, such as a liquid crystal display device, and used as a display device with a touch detection function. For example, a touch screen panel disclosed in the specification of US Patent Application Publication No. 2016-0202829 has a plurality of detection electrodes arranged in a matrix (row-column configuration). In the touch screen panel disclosed in the specification of US Patent Application Publication No. 2016-0202829, touch detection is performed according to change in capacitance in the detection electrodes.

Increase in detection performance has been demanded for a touch detection device.

For the foregoing reasons, there is a need for a display device with a sensor capable of increasing detection performance.

SUMMARY

According to an aspect, a display device with a sensor includes: a substrate including a display region and a peripheral region on a periphery of the display region; a plurality of detection electrodes arranged in a row-column configuration in the display region; and a plurality of detection lines coupled to the respective detection electrodes. A shape of the substrate in a plan view includes a curve of a curved portion. The detection electrodes include a first electrode and a second electrode having a different shape from a shape of the first electrode in a plan view. The second electrode is juxtaposed with the curved portion. The detection lines each include a first line coupled to the first electrode and a second line coupled to the second electrode. The second line passes from the display region across the peripheral region and extends to a position overlapping with the second electrode in a plan view.

According to another aspect, a display device with a sensor includes: a substrate; a plurality of detection electrodes provided to the substrate and arranged in a row-column configuration; and a plurality of detection lines coupled to the respective detection electrodes. A shape of the substrate in a plan view includes a curve of a curved portion. The detection electrodes include a first electrode and a second electrode having a different shape from a shape of the first electrode in a plan view. The second electrode is juxtaposed with the curved portion. The detection lines each include a first line coupled to the first electrode and a second line coupled to the second electrode. The second line includes: a first linear portion juxtaposed with one side of the first line; a fourth linear portion coupled to the first linear portion and located between an end portion of the first line and an edge of the substrate; and a fifth linear portion juxtaposed with another side opposite to the one side of the first line, the first linear portion and the fifth linear portion interposing the first line or an extended line of the first line therebetween.

According to another aspect, a display device with a sensor includes: an external coupling terminal arranged along a first side of a first substrate; a notch formed at a second side of the first substrate, the second side facing the first side; a plurality of detection electrodes arranged in a row-column configuration in a display region; and a metal line coupled to at least one of the detection electrodes. The detection electrodes include: a first detection electrode; and a second detection electrode juxtaposed with the first detection electrode in a column direction and having a different shape from a shape of the first detection electrode. The second detection electrode is located between the notch and the first detection electrode in the column direction and is coupled to the metal line. The metal line includes: a first linear portion extending in a row direction toward the first side; a second linear portion coupled to the first linear portion and extending along the notch; and a third linear portion coupled to the second linear portion and extending in the row direction. The third linear portion is coupled to the second detection electrode through a plurality of contact holes.

DETAILED DESCRIPTION

Figure 1:
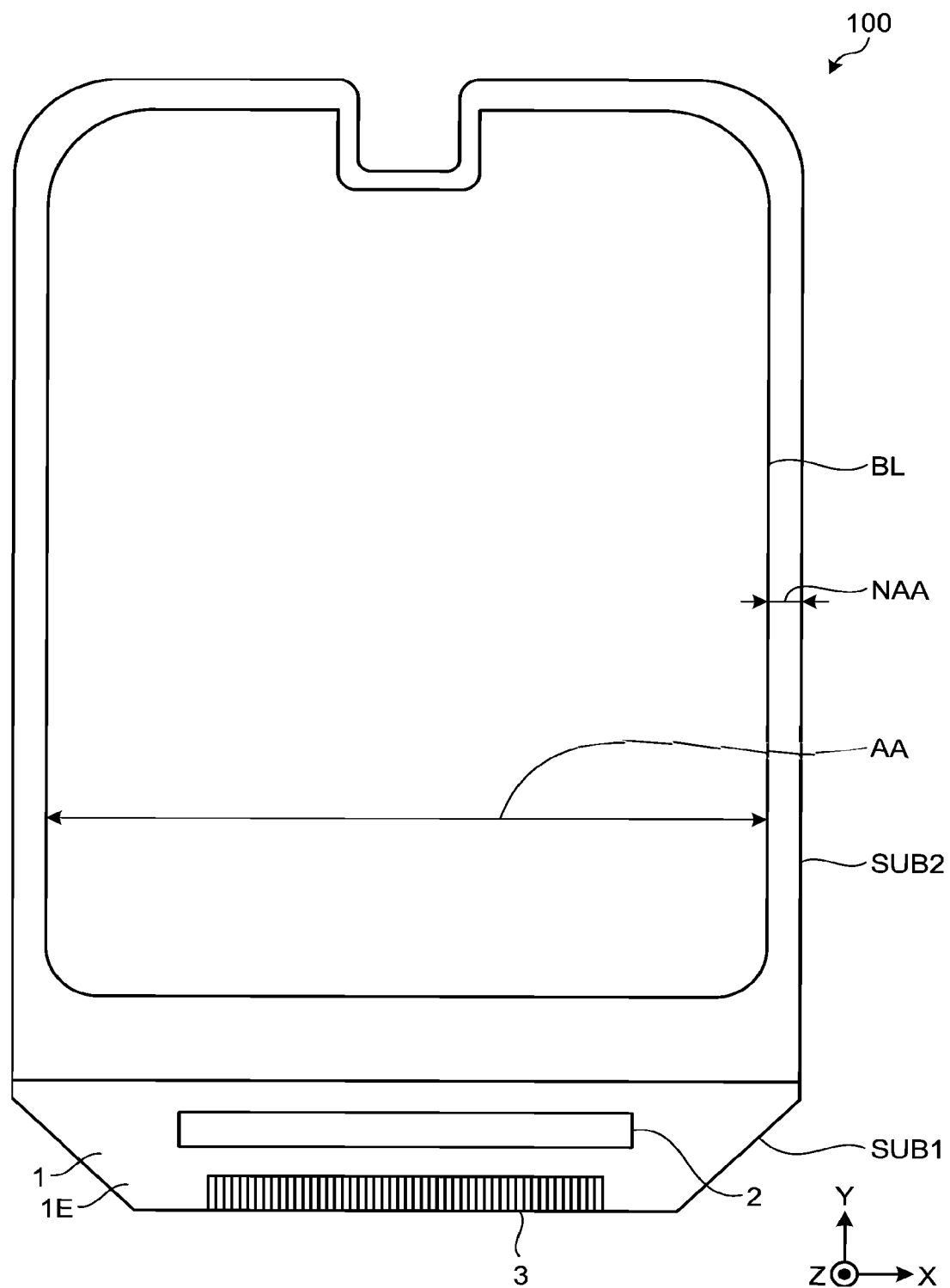
FIG. 1 is a plan view illustrating a configuration example of a display device with a sensor according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

Figure 2:
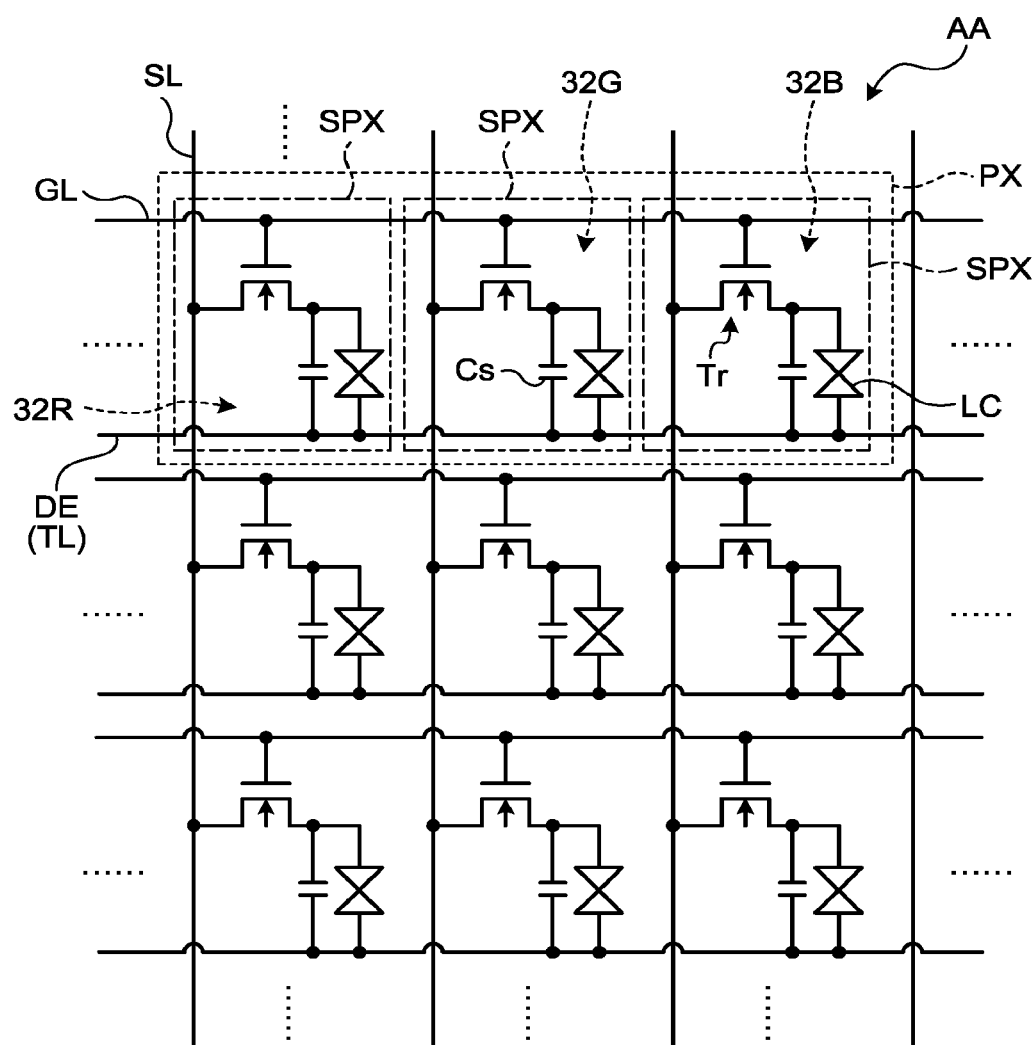
FIG. 2 is a circuit diagram illustrating a pixel array in a display region according to the first embodiment.

FIG. 1 is a plan view illustrating a configuration example of a display device with a sensor according to a first embodiment. FIG. 2 is a circuit diagram illustrating a pixel array in a display region according to the first embodiment. In the following description, an X-Y-Z Cartesian coordinate system is set and a positional relationship is explained with reference to the X-Y-Z Cartesian coordinate system. A first direction is referred to as an X-axis direction; a second direction orthogonal to the first direction is referred to as a Y-axis direction; and a direction orthogonal to the X-axis direction and the Y direction (i.e., direction perpendicular to an X-Y plane) is a Z-direction. In the present specification, "a plan view" is referred to as a view from a direction normal to the X-Y plane parallel to the X-axis and the Y-axis. In the present specification, an upper side is referred to as an arrow direction of the Y-axis; a lower side is referred to as the opposite direction of the arrow direction of the Y-axis; a right side is referred to as an arrow direction of the X-axis; and a left side is referred to as the opposite direction of the arrow direction of the X-axis. The X-axis direction is also referred to as a column direction and the Y-axis direction is also referred to as a row direction. The Z-axis direction is also referred to as a perpendicular direction.

As illustrated in FIG. 1, the display device 100 with a sensor according to the first embodiment includes a first substrate SUB1 and a second substrate SUB2 facing the first substrate SUB1. The display device 100 with a sensor is, for example, a liquid crystal panel with a touch detection function, in which a liquid crystal layer (not illustrated) is interposed between the first substrate SUB1 and the second substrate SUB2. The first substrate SUB1 is, for example, a thin film transistor (TFT) substrate. The second substrate SUB2 is a counter substrate.

The display device 100 with a sensor is provided with, in addition to the first substrate SUB1 and the second substrate SUB2, an illuminating device such as a backlight, and other miscellaneous equipment as needed, which are omitted in FIG. 1. In the present embodiment, the display device with a sensor is not limited to the liquid crystal panel with a touch detection function, and may be an organic electroluminescence (EL) panel with a touch detection function.

The first substrate SUB1 includes a region that faces the second substrate SUB2, in which a plurality of lines (e.g., gate lines GL, signal lines SL, and detection lines TL illustrated in FIG. 2) that extends in the X-axis direction and the Y-axis direction. In the first substrate SUB1, each of intersecting portions of the gate lines GL and the signal lines SL corresponds to a minimum unit for display, i.e., a sub-pixel SPX illustrated in FIG. 2. The entirety of a display region AA is formed by arraying a plurality of sub-pixels in a matrix (row-column configuration). Although not illustrated, a color filter including a black matrix layer BM (refer to FIG. 7 described later), for example, is arranged between the liquid crystal layer and the second substrate SUB2. The color filter may be printed on a surface of the second substrate SUB2, the surface facing the first substrate SUB1.

Figure 7:
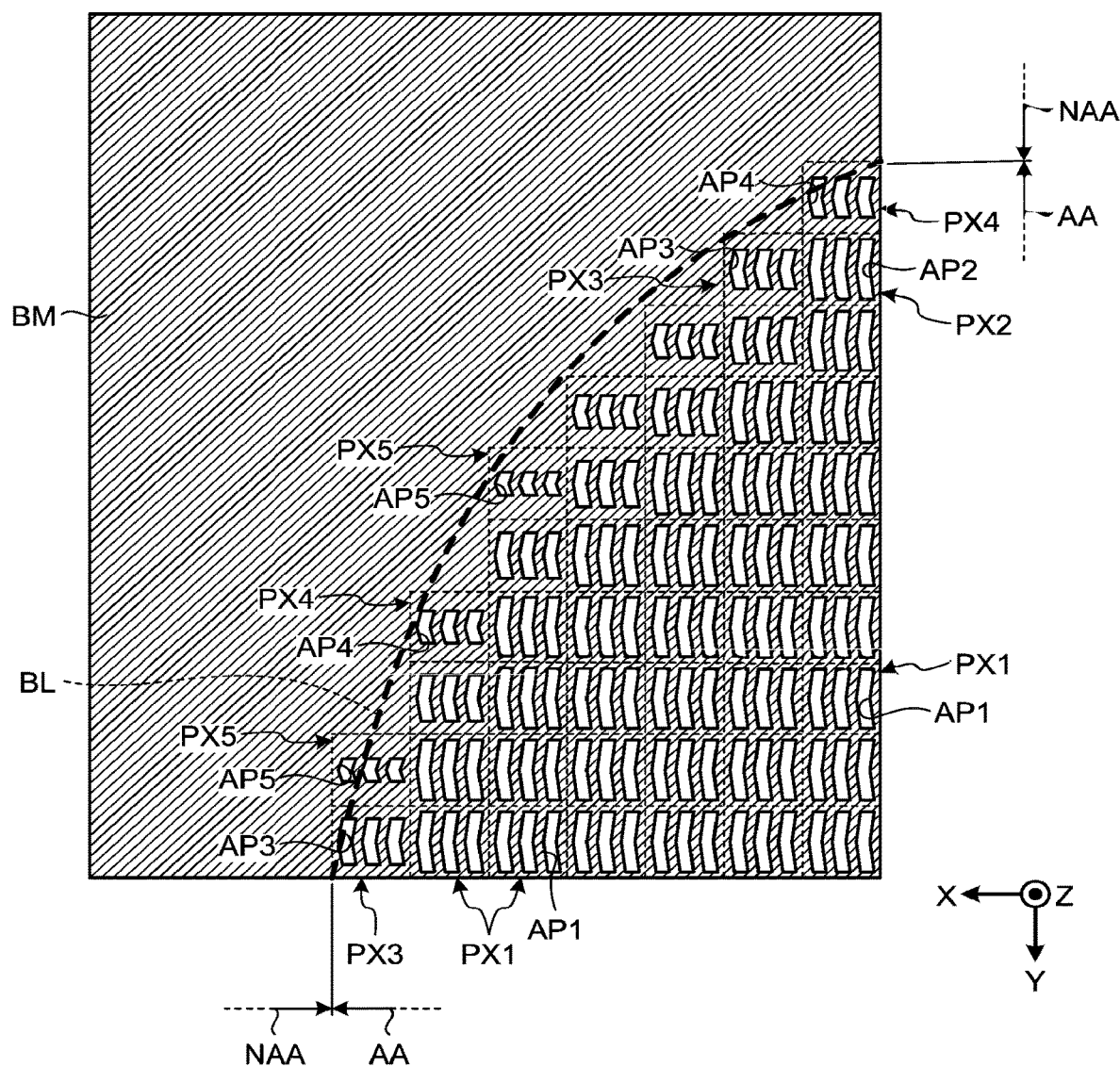
FIG. 7 is a plan view illustrating a configuration example of a black matrix layer according to the first embodiment.

As illustrated in FIG. 1, the display device 100 with a sensor includes the display region AA and a peripheral region NAA on the perimeter of the display region AA. The peripheral region NAA is, for example, a frame region in which display is not performed. The peripheral region NAA is covered with, for example, the black matrix layer BM. As illustrated in FIG. 7 to be described later, a border line BL between the display region AA and the peripheral region NAA is determined by the black matrix BM.

The first substrate SUB1 includes an overhanging portion 1E that extends outwards over the second substrate SUB2. The overhanging portion 1E is provided with a driver integrated circuit (IC) 2 and an external coupling terminal 3. The lines (e.g., the gate lines GL, the signal lines SL, and the detection lines TL illustrated in FIG. 2) arranged in the display region AA are coupled to the driver IC 2. The driver IC 2 transmits and receives signals to and from an external device through the external coupling terminal 3.

In the present embodiment, the driver IC 2 may be provided to another wiring substrate coupled to the first substrate SUB1. For example, a flexible printed circuit (FPC) substrate may be bonded to the overhanging portion 1E, and the driver IC 2 may be mounted on the FPC. In this case, the overhanging portion 1E and the FPC may be coupled to each other through an anisotropic conductive film (ACF), which is not illustrated.

Examples of the first substrate SUB' and the second substrate SUB2 include, but are not limited to, glass substrates. Alternatively, first substrate SUB1 and the second substrate SUB2 may be resin substrates having flexibility.

As illustrated in FIG. 2, the first substrate SUB1 is provided with, for example, a pixel transistor Tr serving as a switching element of each sub-pixel SPX, the signal line SL, the gate line GL, the detection line TL, and a detection electrode DE coupled to the detection line TL. The signal line SL is wiring to supply a pixel signal to a pixel electrode PE. The gate line GL is wiring to supply a drive signal for driving each pixel transistor Tr. The signal line SL and the gate line GL each extend on a plane parallel to a surface of the first substrate SUB1.

The display region AA has the sub-pixels SPX arrayed in a matrix (row-column configuration). The sub-pixels SPX each include the pixel transistor Tr and liquid crystal LC. The pixel transistor Tr is a thin film transistor, and in this example, an n-channel metal oxide semiconductor (MOS) TFT. An insulating layer 53 (refer to FIG. 4 described later) is arranged between the pixel electrode PE and the detection electrode DE, thereby forming holding capacitance Cs.

The color filter includes periodically arrayed color areas, for example, in three colors of red (R), green (G), and blue (B). Color areas 32R, 32G, and 32B in the three colors of R, G, and B, which serve as a set, correspond to the respective sub-pixels SPix illustrated in FIG. 2. A set of sub-pixels SPix corresponding to the respective color areas 32R, 32G, and 32B in the three colors constitutes one pixel Pix. The color filter may include color areas in four or more colors.

The pixel electrodes PE, which are described later, correspond to the respective sub-pixels SPX constituting each pixel PX. The pixel signal for causing the display device 100 with a sensor to perform a display operation is supplied from a non-illustrated source driver to the pixel electrode PE. The source driver is, for example, built into the driver IC 2. At the time of a display operation, a drive signal for display, which is a direct-current voltage signal, is supplied to the detection electrode DE through the detection line TL. Accordingly, the detection electrode DE serves as a common electrode for a plurality of pixel electrodes PE. At the time of touch detection, the detection electrode DE serves as a detection electrode.

For example, the display device 100 with a sensor time-divisionally performs a display operation (in a display period) and a touch detection operation by a self-capacitance detection method (in a touch detection period). In the display operation, a detection electrode driver (not illustrated) included in the driver IC 2 supplies drive signals for display to all the detection electrodes DE. In the touch detection, the detection electrode driver supplies drive signals for touch detection simultaneously or time-divisionally to the detection electrodes DE. The drive signals for touch detection are supplied to the detection electrodes DE through the detection lines TL.

The detection electrode DE outputs a sensor output signal in accordance with change in capacitance of the corresponding detection electrode DE to an analog front end (AFE) circuit, which is not illustrated. The AFE is, for example, built into the driver IC 2. Touch detection in the display region AA is performed in accordance with the sensor output signal from each detection electrode DE. In this manner, the detection electrode DE serves as a common electrode at the time of a display operation, while serving as a detection electrode at the time of touch detection by the elf-capacitance detection method.

Figure 3:
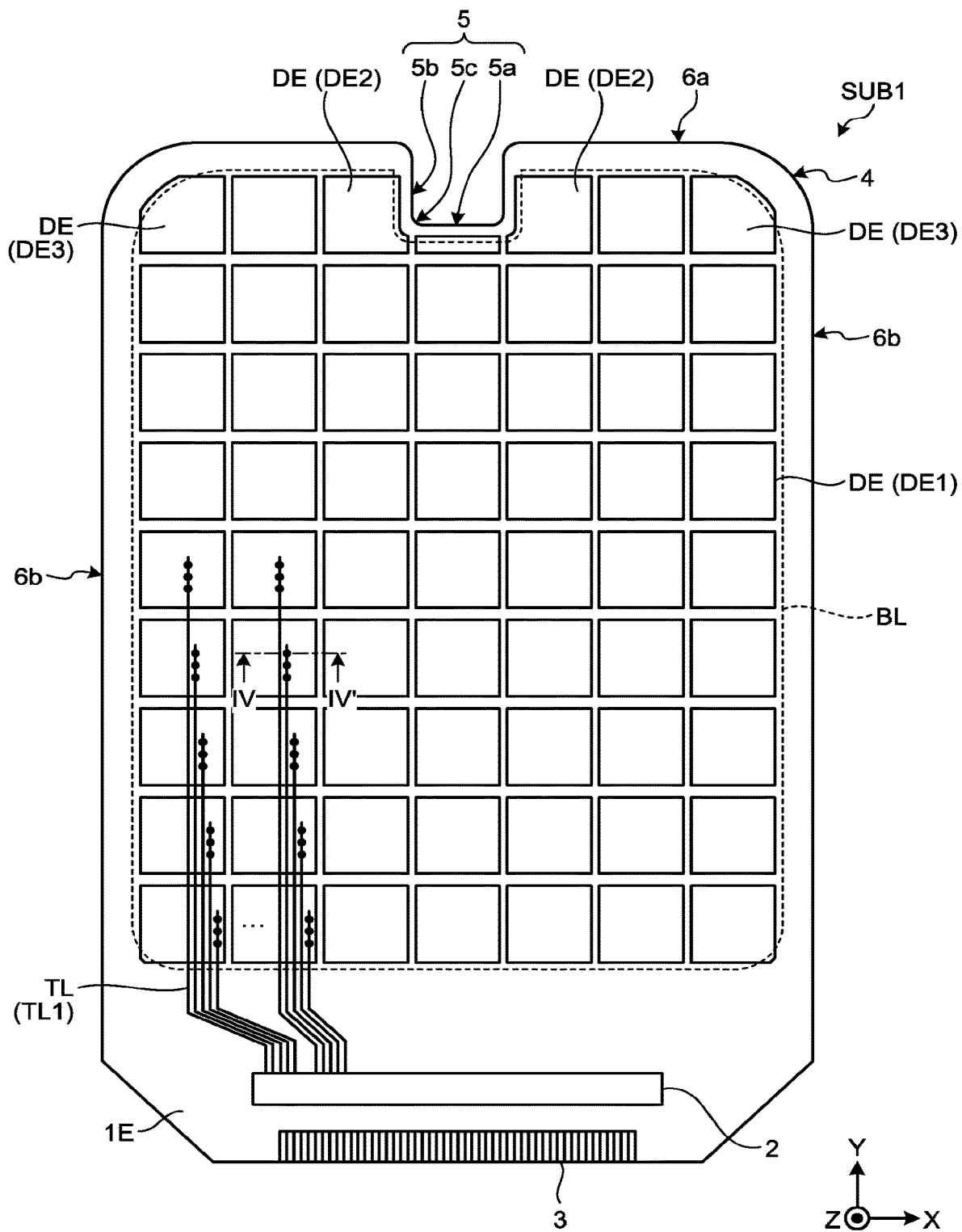
FIG. 3 is a plan view illustrating a configuration example of a first substrate according to the first embodiment.
Figure 4:
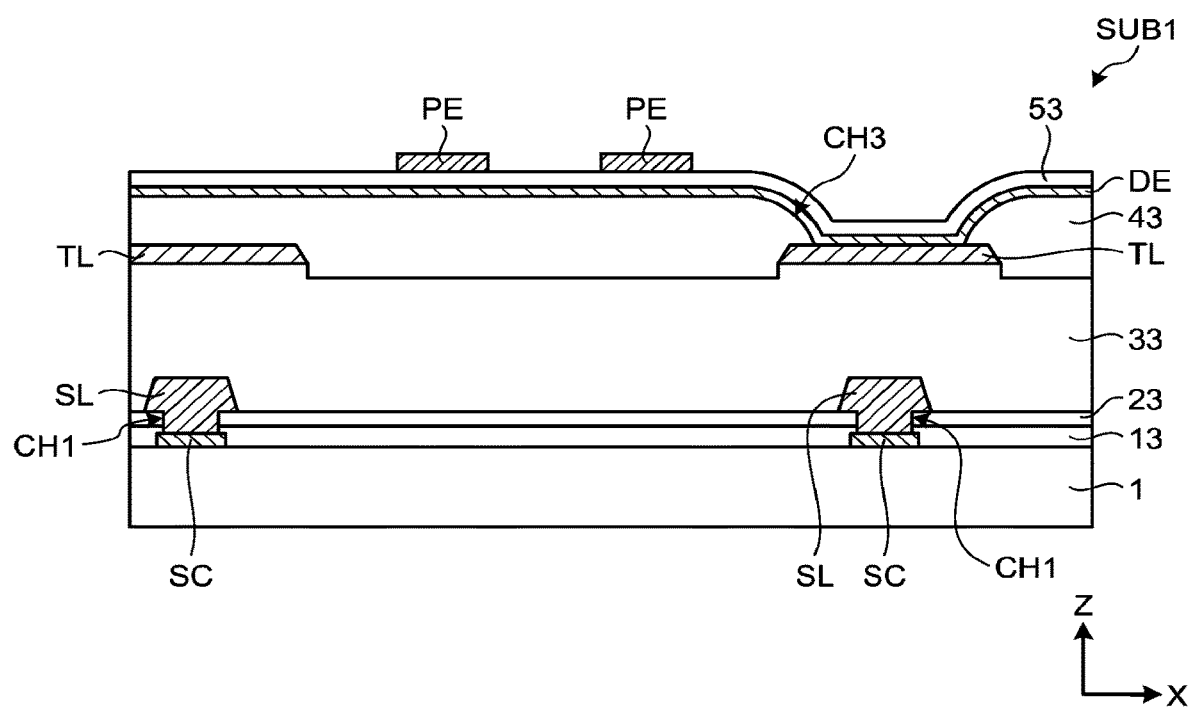
FIG. 4 is a sectional view schematically illustrating a cross-section taken along line IV-IV' in FIG. 3.

FIG. 3 is a plan view illustrating a configuration example of the first substrate according to the first embodiment. FIG. 4 is a sectional view schematically illustrating a cross-section taken along line IV-IV' in FIG. 3. For avoiding complexity of the figure, FIG. 3 does not illustrates: a second planarization film 43 at a lower layer side of the detection electrodes DE; the detection electrodes DE; the insulating layer 53; and the pixel electrodes PE. Although FIG. 3 illustrates the detection lines TL in solid lines for avoiding complexity of the figure, the detection lines TL are located at a lower layer side of the detection electrodes DE.

As illustrated in FIG. 4, the first substrate SUB1 includes: a semiconductor film SC arranged on the upper side of a base material 1 (refer to FIG. 15 described later); an insulating film 13 covering the semiconductor film SC; an interlayer-insulating film 23 arranged on the insulating film 13; and the signal line SL arranged on the interlayer-insulating film 23. A contact hole CH1 is provided to the insulating film 13 and the interlayer-insulating film 23. The signal line SL is coupled to the semiconductor film SC through the contact hole CH1. Although not illustrated, the gate line GL (refer to FIG. 2) is arranged between the insulating film 13 and the interlayer-insulating film 23.

The base material 1 is, for example, a glass substrate or a resin substrate having flexibility. The gate line GL is made of a material including molybdenum. The insulating film 13 is a gate insulating film. The insulating film 13 is an inorganic insulating film such as a silicon dioxide film and a silicon nitride film. The insulating film 13 is, for example, a layered body of films in which the silicon dioxide film and the silicon nitride film stacked in this order from the base material 1 side. The semiconductor film SC is a polysilicon film. The interlayer-insulating film 23 is an inorganic insulating film such as a silicon dioxide film and a silicon nitride film. The interlayer-insulating film 23 is, for example, a layered body of films in which the silicon dioxide film, the silicon nitride film, and the silicon dioxide film staked in this order from the base material 1 side. The signal line SL and a drain SLD of the pixel transistor Tr (refer to FIG. 12 and FIG. 15 described later) are made of titanium and aluminum. Each of the signal line SL and the drain SLD is, for example, a layered body of films in which titanium, aluminum, and titanium are stacked in this order from the base material 1 side.

The first substrate SUB1 includes: a first planarization film 33 arranged on the interlayer-insulating film 23; the detection lines TL arranged on the first planarization film 33;

the second planarization film 43 arranged on the first planarization film 33 and covering the detection lines TL; the detection electrodes DE arranged on the second planarization film 43; the insulating layer 53 arranged on the detection electrodes DE; and the pixel electrodes PE arranged on the insulating layer 53.

Each of the first planarization film 33 and the second planarization film 43 is, for example, an organic insulating film such as an acrylate resin film. Alternatively, the second planarization film 43 may be an inorganic insulating film. Each of the detection electrode DE and the pixel electrode PE is made of indium tin oxide (ITO), serving as a translucent conductive layer. The insulating layer 53 is an inorganic insulating layer such as a silicon nitride film.

According to the present embodiment, as illustrated in FIG. 4, the detection electrodes DE are arranged in a matrix (row-column configuration) in the display region AA of the first substrate SUB1. For example, a plurality of detection electrodes DE is arrayed in the X-axis direction and a plurality of detection electrodes DE is arrayed in the Y-axis direction. The detection electrodes DE are coupled to the respective detection lines TL.

According to the present embodiment, one detection electrode DE is coupled to one detection line TL at a plurality of points. The number of contacts (the number of contact holes CH3) in one detection line TL corresponding to one detection electrode DE are plural. The detection line TL has a width extending in the X-axis direction. The detection lines TL are arrayed in the X-axis direction at intervals. The detection electrodes DE are coupled to the driver IC 2 through the respective detection lines TL. A configuration may be employed in which one detection line TL pulled out from the driver IC 2 branches into a plurality of lines in the display region AA. In this case, a plurality of detection lines TL is coupled to one detection electrode DE at a plurality of points. For simplification, FIG. 3 illustrates the detection line TL as one line even with the wiring configuration in which one detection line TL pulled out from the driver IC 2 branches into a plurality of lines in the display region AA.

As illustrated in FIG. 3, in each column in which the detection electrodes DE are arrayed in the Y-axis direction, the detection electrodes DE are coupled to the respective detection lines TL, for example, in descending order from the left side to the right side. That is, in each column in which the detection electrodes DE are arrayed in the Y-axis direction, the detection electrode DE at the uppermost side is coupled to the detection line TL at the leftmost side. In each column in which the detection electrodes DE are arrayed in the Y-axis direction, the detection electrode DE at the lowermost side is coupled to the detection line TL at the rightmost side. In each column in which the detection electrodes DE are arrayed in the Y-axis direction, the lower the position of the detection electrode DE is, the more right the position of the detection line TL coupled to the corresponding detection electrode DE is.

As illustrated in FIG. 3, the shape of the first substrate SUB1 is not a rectangle but an irregular shape in a plan view. The perimeter of the first substrate SUB' includes: a corner 4 including a curve; and a notch 5 including a curve. The perimeter of the first substrate SUB1 includes, for example, a first side 6a in parallel to the X-axis direction, and second sides 6b in parallel to the Y-axis direction. In FIG. 3, the first side 6a is the upper edge of the first substrate SUB1, and the second sides 6b are the side and left edges of the first substrate SUB1. The corner 4 is a portion connecting the first side 6a in parallel to the X-axis direction and the second side 6b in parallel to the Y-axis direction to each other. The corner 4 forms a curve. The perimeter of the first substrate SUB1 includes the notch 5 that is recessed from the first side 6a toward the display region AA in a plan view. The notch 5 includes: a third side 5a in parallel to the X-axis direction; a fourth side 5b in parallel to the Y-axis direction; and a corner 5c connecting the third side 5a and the fourth side 5b to each other. The corner 5c forms a curve.

The shape of the second substrate SUB2 (refer to FIG. 1) bonded to the first substrate SUB1 is not a rectangle but an irregular shape in a plan view. The perimeter of the second substrate SUB2 includes, for example, a corner including a curve and a recessed portion including a curve. The shape and size of the second substrate SUB2 match with those of the first substrate SUB1 excluding the overhanging portion 1E (refer to FIG. 1).

The detection electrodes DE include a first detection electrode DE1, a second detection electrode DE2, and a third detection electrode DE3. The first detection electrode DE1 has a rectangular shape in a plan view. The second detection electrode DE2 has a shape and a size (area), at least one of which is different from the shape or the size (area) of the first detection electrode DE1 in a plan view. The third detection electrode DE3 has a shape and a size (area), at least one of which is different from the shape or the size (area) of the first detection electrode DE1 in a plan view. The second detection electrode DE2 is juxtaposed with the notch 5. For example, the second detection electrode DE2 is arranged at either side of the notch 5. The third detection electrode DE3 is juxtaposed with the corner 4.

The edge of the second detection electrode DE2 juxtaposed with the notch 5 is in parallel or substantially parallel to the notch 5. For example, the edge of the second detection electrode DE2 juxtaposed with the corner 5c of the notch 5 is curved along the corner 5c. Similarly, the edge of the third detection electrode DE3 juxtaposed with the corner 4 is in parallel or substantially parallel to the corner 4. For example, the edge of the third detection electrode DE3 juxtaposed with the corner 4 is curved along the corner 4.

In the following description, a line coupled to the first detection electrode DE1 is referred to as a first detection line TL1; a line coupled to the second detection electrode DE2 is referred to as a second detection line TL2; and a line coupled to the third detection electrode DE3 is referred to as a third detection line TL3.

Figure 5:
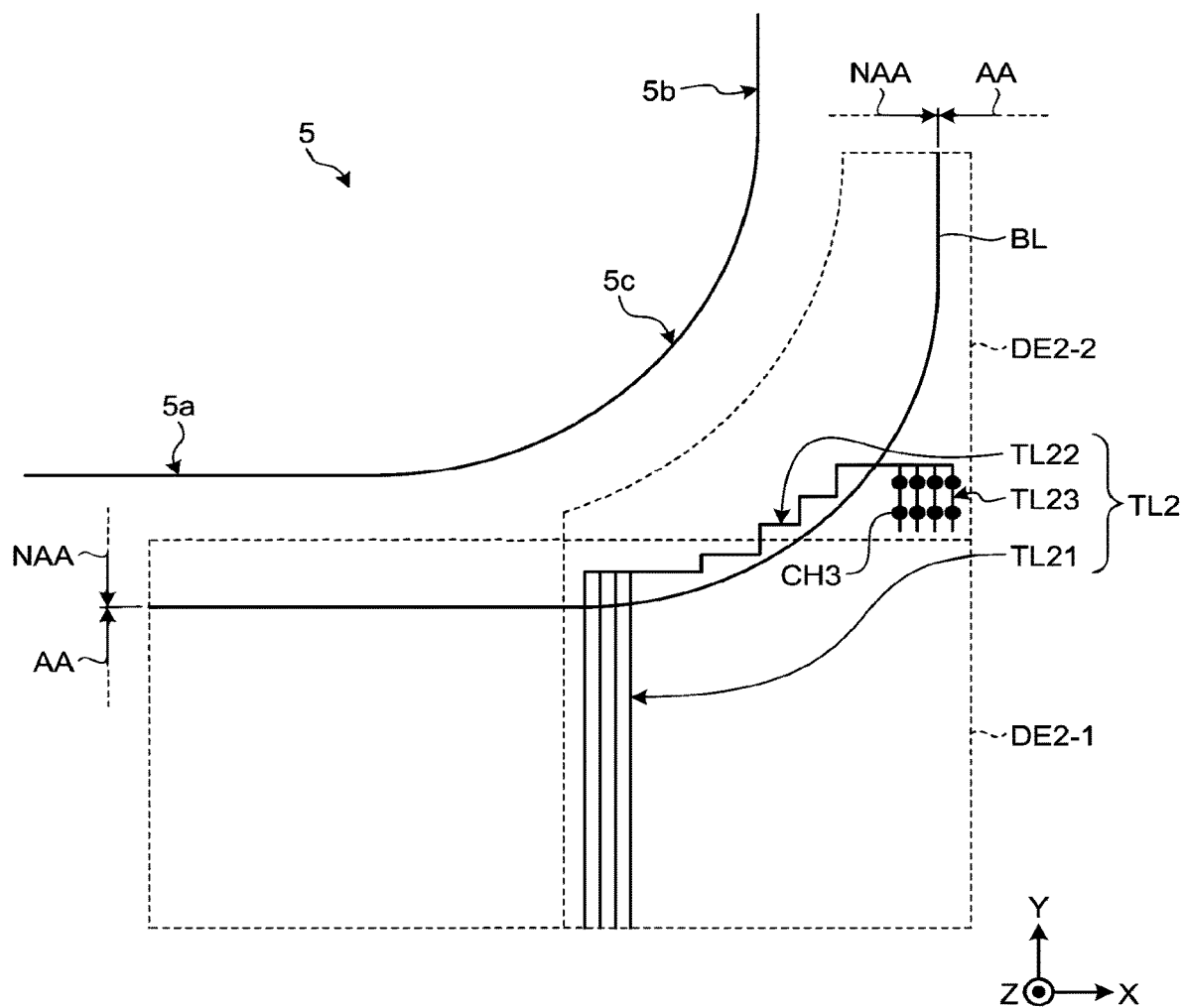
FIG. 5 is a plan view illustrating an example of coupling between a second detection electrode and a second detection line according to the first embodiment.

FIG. 5 is a plan view illustrating an example of coupling between the second detection electrode and the second detection line according to the first embodiment. As illustrated in FIG. 5, the second detection line TL2 passes from the display region AA across the peripheral region NAA in the proximity of the notch 5, and is coupled to a second detection electrode DE2-2. The second detection line TL2 includes, for example, a first linear portion TL21, a second linear portion TL22, and a third linear portion TL23. The first linear portion TL21 is located in the display region AA. One end of the first linear portion TL21 is coupled to the driver IC 2 (refer to FIG. 3), and the other end thereof is coupled to the second linear portion TL22. The second linear portion TL22 is located in the peripheral region NAA. The third linear portion TL23 is located in the display region AA. One end of the third linear portion TL23 is coupled to the second linear portion TL22, and the other end thereof is coupled to the second detection electrode DE2-2 through the contact holes CH3.

The second detection electrode DE2 extends from the display region AA to the peripheral region NAA. An end portion of the second detection electrode DE2 juxtaposed with the notch 5 is curved along the notch 5. In the peripheral region NAA, the second linear portion TL22 of the second detection line TL2 overlaps, in a plan view, with a portion of the second detection electrode DE2-2 extending in the peripheral region NAA. For example, the second linear portion TL22 in the peripheral region NAA overlaps with the second detection electrode DE2-2 in a plan view. This arrangement can reduce parasitic capacitance in the second detection line TL2.

At least part of the second linear portion TL22 is composed of one line. With this configuration, even when the portion of the second detection electrode DE2-2 extending in the peripheral region NAA is small in width, the second detection line TL2 can be extended so as to overlap with the second detection electrode DE2-2 in a plan view. FIG. 5 illustrates an example in which one second detection electrode DE2 is coupled to four second detection lines TL2 that are combined into one line in the peripheral region NAA.

The third linear portion TL23 branches into a plurality of lines to be coupled to the second detection electrode DE2-2. With this configuration, the number of contacts between the second detection line TL2 and the second detection electrode DE2-2 can be easily increased.

In FIG. 5, the second linear portion TL22 has a zig-zag shape such that a line in parallel to the X-axis direction and a line in parallel to the Y-axis direction are alternately coupled to each other in series. However, this configuration is merely an example. Reducing the length of the line in parallel to the X-axis direction and the length of the line in parallel to the Y-axis direction and alternately arranging multitudes of the two lines allow the second linear portion TL22 to have a curved shape or a substantially curved shape.

Figure 6:
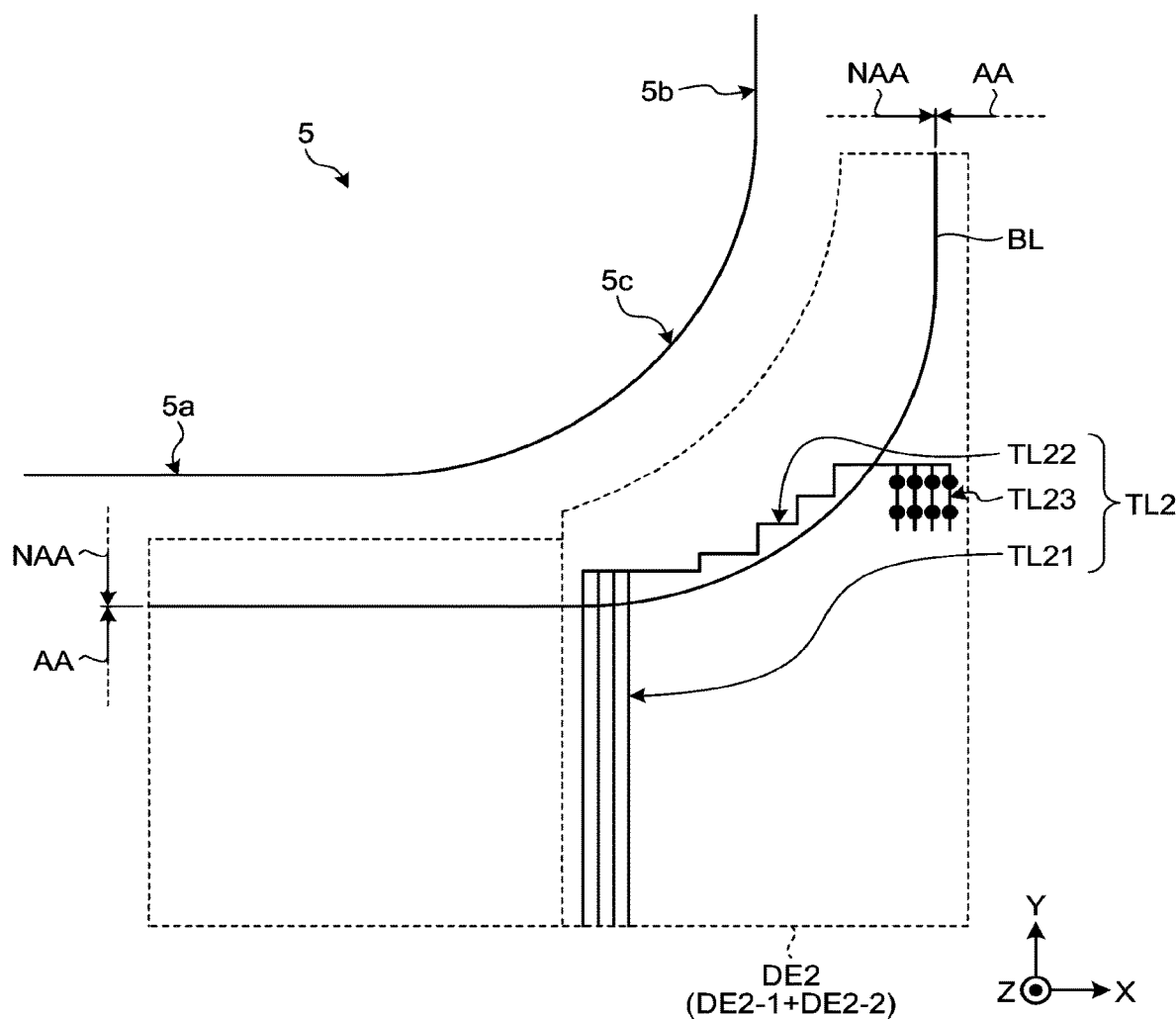
FIG. 6 is a plan view illustrating an example (another example) of coupling between the second detection electrode and the second detection line according to the first embodiment.

FIG. 5 illustrates an example in which a second detection electrode DE2-1 and the second detection electrode DE2-2 are juxtaposed with each other in the Y-axis direction, and the second detection line TL2 passes through a region overlapping with the second detection electrode DE2-1. However, this configuration is merely an example. FIG. 6 is a plan view illustrating an example (another example) of coupling between the second detection electrode and the second detection line according to the first embodiment. As illustrated in FIG. 6, the present embodiment may employ a configuration in which the second detection electrodes DE2-1 and DE2-2 are one continuous second detection electrode DE2. Even with this configuration, the second detection line TL2 passes from the display region AA across the peripheral region NAA, and is coupled to the second detection electrode DE2.

FIG. 7 is a plan view illustrating a configuration example of the black matrix layer according to the first embodiment. The present embodiment sets a difference in an aperture ratio per unit area of the black matrix layer BM, thereby forming a border line BL between the display region AA and the peripheral region NAA. An aperture ratio per unit area of the black matrix layer BM in the peripheral region NAA is 0%, while an aperture ratio per unit area of the black matrix layer BM in the display region AA is higher than 0%.

For example, the display region AA has the pixels PX including a first pixel PX1, a second pixel PX2, a third pixel PX3, a fourth pixel PX4, and a fifth pixel PX5. The first pixel PX1, the second pixel PX2, the third pixel PX3, the fourth pixel PX4, and the fifth pixel PX5 are different from one another in aperture ratio per unit area of the black matrix layer BM.

Part of the black matrix BM at a position overlapping with the first pixel PX1 includes three first apertures AP1. Part of the black matrix BM at a position overlapping with the second pixel PX2 includes three second apertures AP2. Part of the black matrix BM at a position overlapping with the third pixel PX3 includes three third apertures AP3. Part of the black matrix BM at a position overlapping with the fourth pixel PX4 includes three fourth apertures AP4. Part of the black matrix BM at a position overlapping with the fifth pixel PX5 includes three fifth apertures AP5.

The area of each aperture (i.e., aperture ratio) decreases in order of the first pixel PX1, the second pixel PX2, the third pixel PX3, the fourth pixel PX4, and the fifth pixel PX5. The aperture area of the first aperture AP1 is the largest, while the aperture area of the fifth aperture AP5 is the smallest. With this configuration, light transmittance decreases in order of the first pixel PX1, the second pixel PX2, the third pixel PX3, the fourth pixel PX4, and the fifth pixel PX5.

In the present embodiment, the first pixel PX1, the second pixel PX2, the third pixel PX3, the fourth pixel PX4, and the fifth pixel PX5 are arranged such that light transmittance becomes lower as a position in the display region AA becomes closer to the peripheral region NAA in the X-axis direction and the Y-axis direction. Accordingly, the curved border line BL is determined by the black matrix layer BM.

Figure 8:
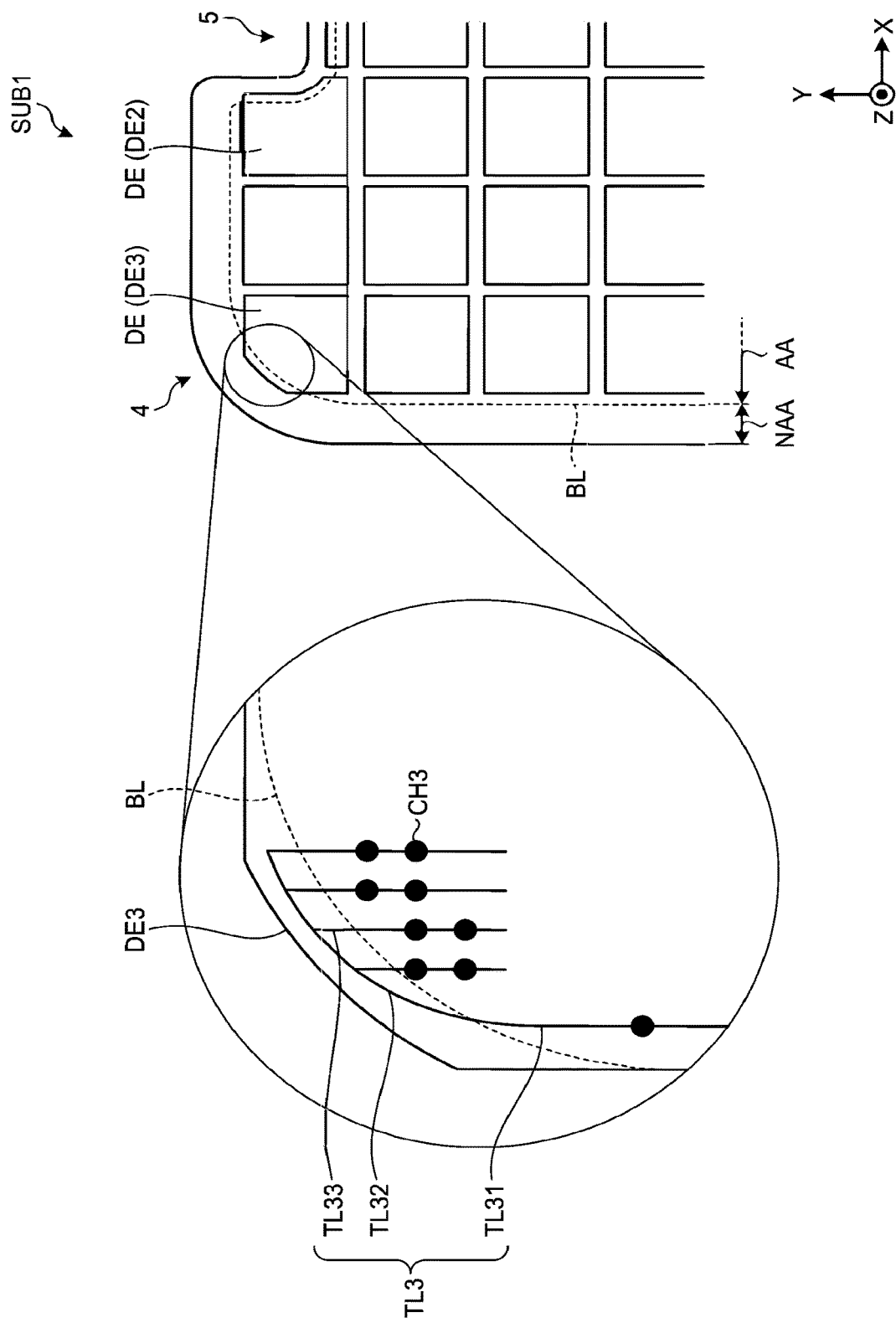
FIG. 8 is a plan view illustrating an example of coupling between a third detection electrode and a third detection line according to the first embodiment.

FIG. 8 is a plan view illustrating an example of coupling between the third detection electrode and the third detection line according to the first embodiment. As illustrated in FIG. 8, the third detection line TL3 passes from the display region AA across the peripheral region in the proximity of the corner 4, and is coupled to the third detection electrode DE3. The third detection line TL3 includes, for example, a first linear portion TL31, a second linear portion TL32, and a third linear portion TL33. The first linear portion TL31 is located in the display region AA. One end of the first linear portion TL31 is coupled to the driver IC 2 (refer to FIG. 3), and the other end thereof is coupled to the second linear portion TL32. The second linear portion TL32 is located in the peripheral region NAA. The third linear portion TL33 is located in the display region AA. One end of the third linear portion TL33 is coupled to the second linear portion TL32, and the other end thereof is coupled to the third detection electrode DE3 though the contact holes CH3.

The third detection electrode DE3 extends from the display region AA to the peripheral region NAA. In the peripheral region NAA, the third detection line TL3 overlaps, in a plan view, with a portion of the third detection electrode DE3 extending in the peripheral region NAA. For example, the third linear portion TL32 located in the peripheral region NAA overlaps with the third detection electrode DE3 in a plan view. This arrangement can reduce parasitic capacitance in the third detection line TL3.

At least part of the second linear portion TL32 is composed of one line. With this configuration, even when the portion of the third detection electrode DE3 extending in the peripheral region NAA is small in width, the third detection line TL3 can be extended so as to overlap with the third detection electrode DE3 in a plan view.

The third linear portion TL33 branches into a plurality of lines to be coupled to the third detection electrode DE3. With this configuration, the number of contacts between the third detection line TL3 and the third detection electrode DE3 can be easily increased.

FIG. 8 illustrates an aspect of the second linear portion TL32 in which a line in parallel to the X-axis direction and a line in parallel to the Y-axis direction are alternately coupled to each other in series. Even with this aspect, reducing the length of the line in parallel to the X-axis direction and the length of the line in parallel to the Y-axis direction allows the second linear portion TL32 to have a substantially curved shape.

In FIG. 8, the second linear portion TL32 has a zig-zag shape such that the line in parallel to the X-axis direction and the line in parallel to the Y-axis direction are alternately coupled to each other in series. However, this configuration is merely an example. Reducing the length of the line in parallel to the X-axis direction and the length of the line in parallel to the Y-axis direction and alternately arranging the two lines a multitude of times allow the third linear portion TL32 to have a curved shape or a substantially curved shape.

Figure 9:
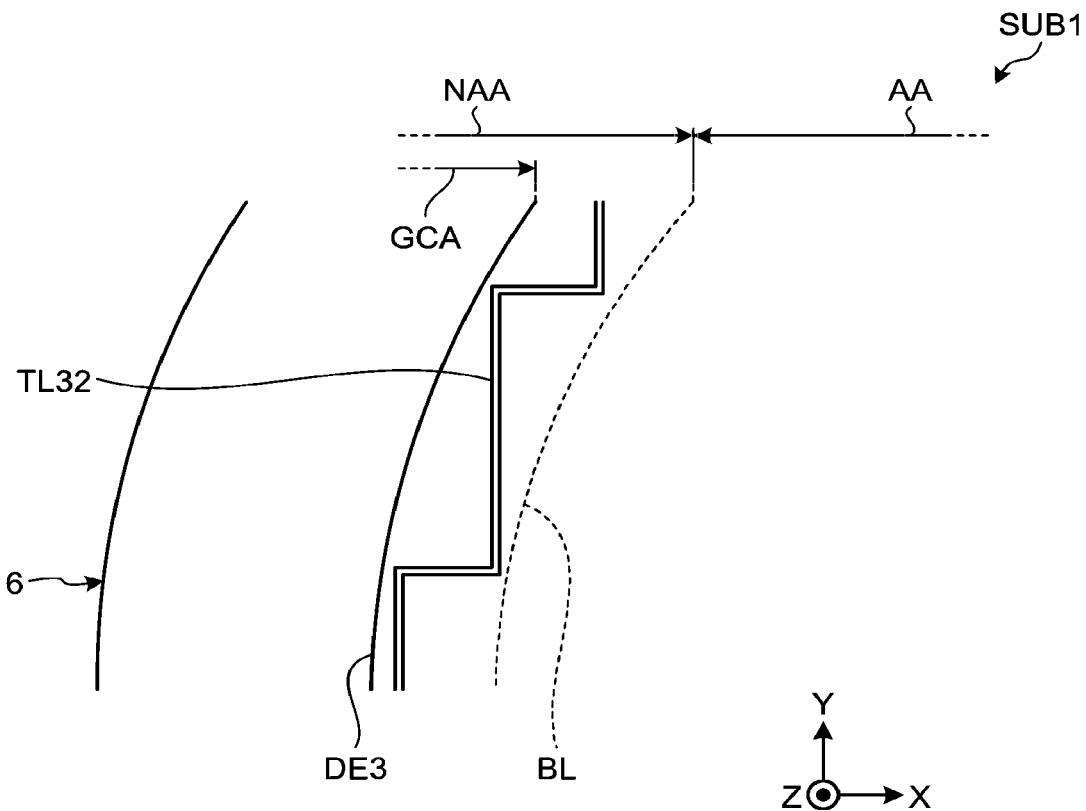
FIG. 9 is a plan view illustrating a positional relationship of the third detection line according to the first embodiment.

FIG. 9 is a plan view illustrating a positional relationship of the third detection line according to the first embodiment. As illustrated in FIG. 9, the third detection electrode DE3 extends from the display region AA to the peripheral region NAA. In the peripheral region NAA, the second linear portion TL32 of the third detection line TL3 overlaps, in a plan view, with a portion of the third detection electrode DE3 extending in the peripheral region NAA. In the peripheral region NAA, a peripheral circuit region GCA, in which a peripheral circuit such as a gate driver is arranged, is provided between the third detection electrode DE3 and an edge 6 of the first substrate SUB1. The second linear portion TL32 is sandwiched by the display region AA and the peripheral circuit region GCA in a plan view.

Figure 10:
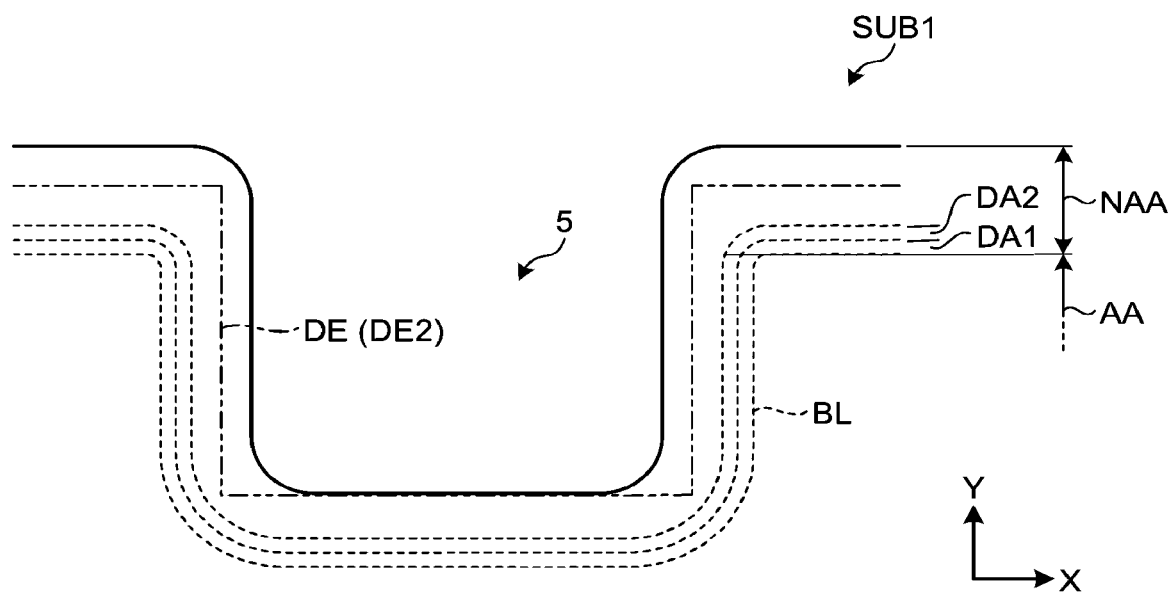
FIG. 10 is a plan view illustrating an example of a first dummy pixel region and a second dummy pixel region that are arranged in the proximity of a recessed portion of the first substrate according to the first embodiment.
Figure 11:
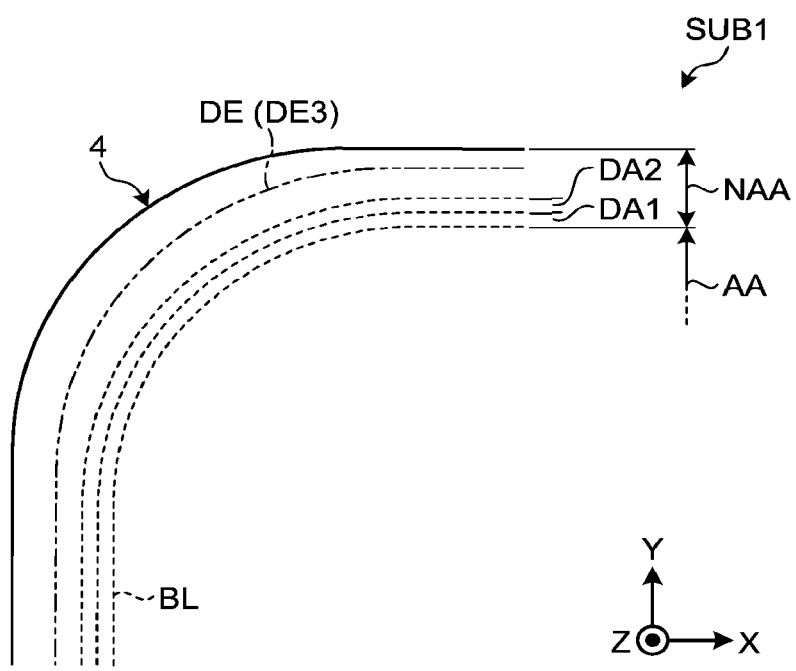
FIG. 11 is a plan view illustrating an example of the first dummy pixel region and the second dummy pixel region that are arranged in the proximity of a corner of the first substrate.

FIG. 10 is a plan view illustrating an example of a first dummy pixel region and a second dummy pixel region that are arranged in the proximity of the recessed portion of the first substrate according to the first embodiment. FIG. 11 is a plan view illustrating an example of the first dummy pixel region and the second dummy pixel region that are arranged in the proximity of the corner of the first substrate. An end portion of the detection electrode DE extends to the peripheral region NAA in a plan view, and may overlap a first dummy pixel transistor DTr1 (refer to FIG. 13 and FIG. 16 described later) in a first dummy pixel region DA1 and a second dummy pixel transistor DTr2 (refer to FIG. 14 and FIG. 17 described later) in the second dummy pixel region DA2. The second linear portion TL22 (refer to FIG. 5) of the second detection line TL2 and the second linear portion TL32 (refer to FIG. 8) of the third detection line TL3 may be formed in the first dummy pixel region DA1 and the second dummy pixel region DA2.

In the present embodiment, the number of effective pixels contributing to display and load (parasitic capacitance) on the gate lines GL at a position overlapping with the second detection electrode DE2 in a plan view are less than those at a position overlapping with the first detection electrode DE1 in a plan view. Similarly, the number of effective pixels contributing to display and load (parasitic capacitance) on the gate lines GL at a position overlapping with the third detection electrode DE3 in a plan view are less than those at a position overlapping with the first detection electrode DE1 in a plan view. With this configuration, there may occur a difference in luminance for display attributable to a difference in capacitance in the gate lines GL between a row in which the second detection electrodes DE2 or the third detection electrodes DE3 are arranged and a row in which the second detection electrodes DE2 or the third detection electrodes DE3 are not arranged (i.e., only the first detection electrodes DE1 are arranged). Even within the row in which the second detection electrodes DE2 or the third detection electrodes DE3 are arrayed, the number of effective pixels changes along the curve of the notch 5, which may cause the difference in luminance for display.

In consideration of the above, the present embodiment provides the first dummy pixel region DA1 in the peripheral region NAA in the proximity of the notch 5, as illustrated in FIG. 10, to reduce the difference in luminance. In the first dummy pixel region DA1, the first dummy pixel transistor DTr1 for load adjustment is coupled to the gate line GL. As illustrated in FIG. 11, the first dummy pixel region DA1 is also arranged in the peripheral region NAA in the proximity of the corner 4. Also in the first dummy pixel region DA1 in the proximity of the corner 4, the first dummy pixel transistor DTr1 for load adjustment is coupled to the gate line GL.

In a process of manufacturing the first substrate SUB1 and a process of bonding the first substrate SUB1 and the second substrate SUB2 together, a manufacturing apparatus may approach the corner 4 and the notch 5 of the first substrate SUB1. When a significant potential difference exits between the first substrate SUB1 and the manufacturing apparatus, electrostatic discharge (ESD) may occur at the corner 4 and the notch 5. To lower the possibility of ESD, the present embodiment provides the second dummy pixel electrode region DA2 in the peripheral region NAA in the proximity of the notch 5, as illustrated in FIG. 10. The second dummy pixel region DA2 is closer to the edge 6 of the first substrate SUB1 than the first dummy pixel region DA1 is to the edge 6 of the first substrate SUB1. In the second dummy pixel region DA2, the second dummy pixel transistor DTr2 as a countermeasure against ESD is coupled to the gate line GL. As illustrated in FIG. 11, the second dummy pixel region DA2 is also arranged in the peripheral region NAA in the proximity of the corner 4. Also in the second dummy pixel region DA2 in the proximity of the corner 4, the second dummy pixel transistor DTr2 as the countermeasure against ESD is coupled to the gate line GL.

Figure 12:
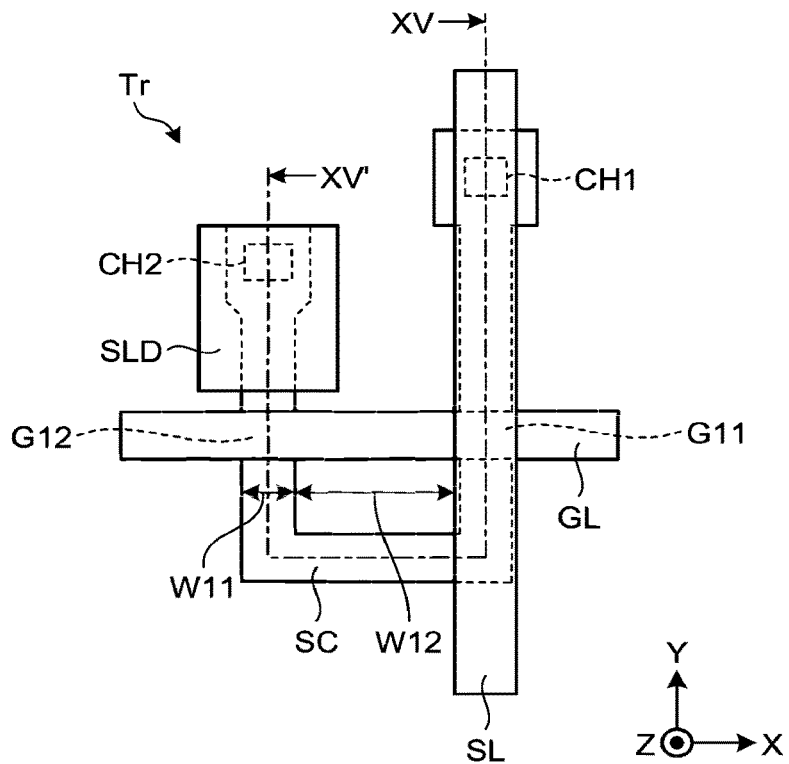
FIG. 12 is a plan view illustrating a configuration example of a pixel transistor according to the first embodiment.
Figure 13:
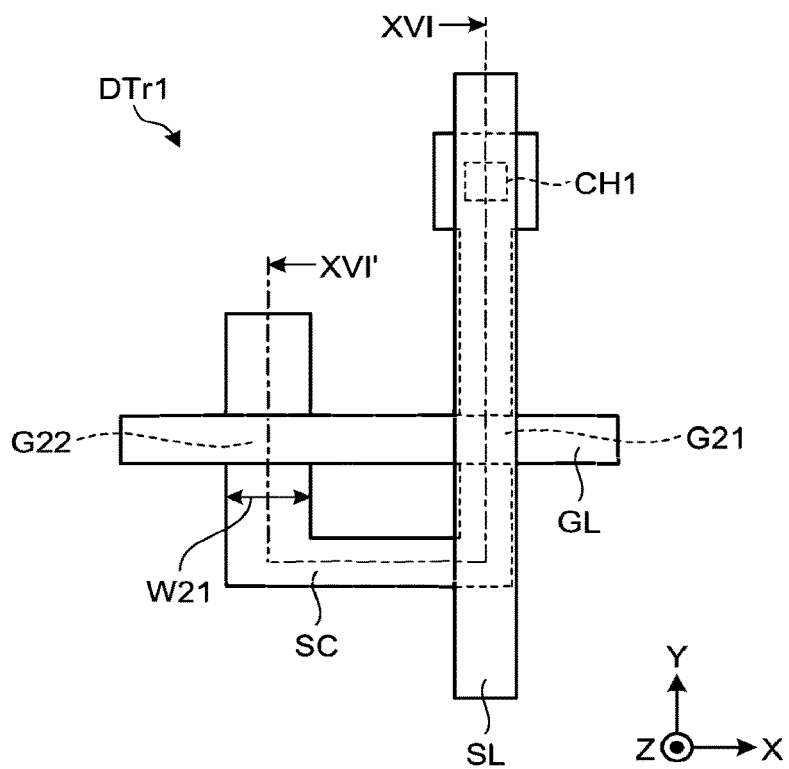
FIG. 13 is a plan view illustrating a configuration example of a first dummy pixel transistor.
Figure 14:
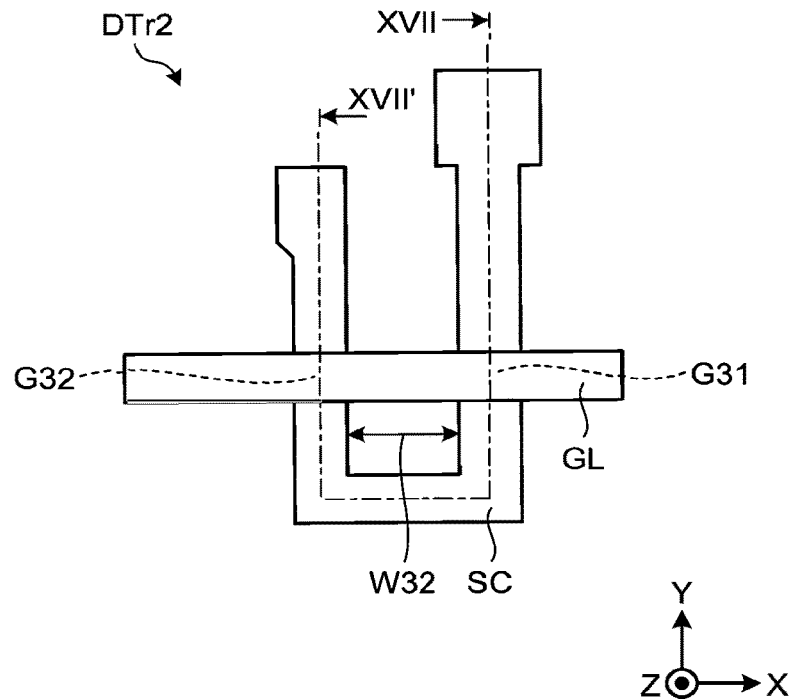
FIG. 14 is a plan view illustrating a configuration example of a second dummy pixel transistor according to the first embodiment.
Figure 15:
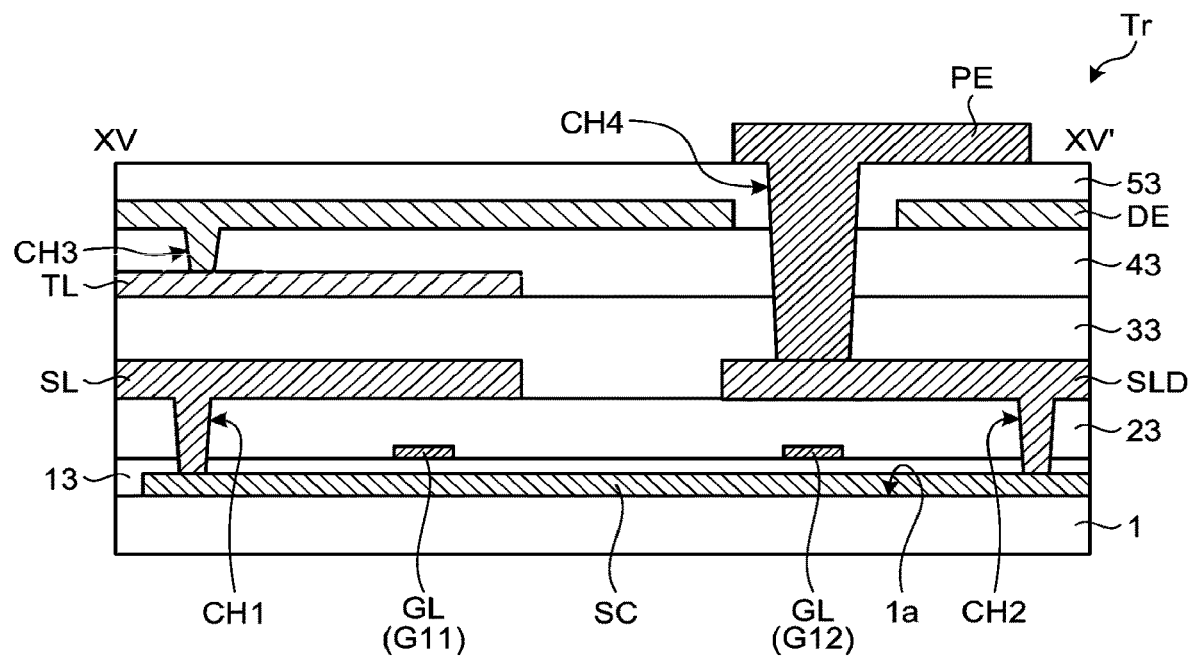
FIG. 15 is a sectional view schematically illustrating a cross-section of the pixel transistor taken along line XV-XV' in FIG. 12.
Figure 16:
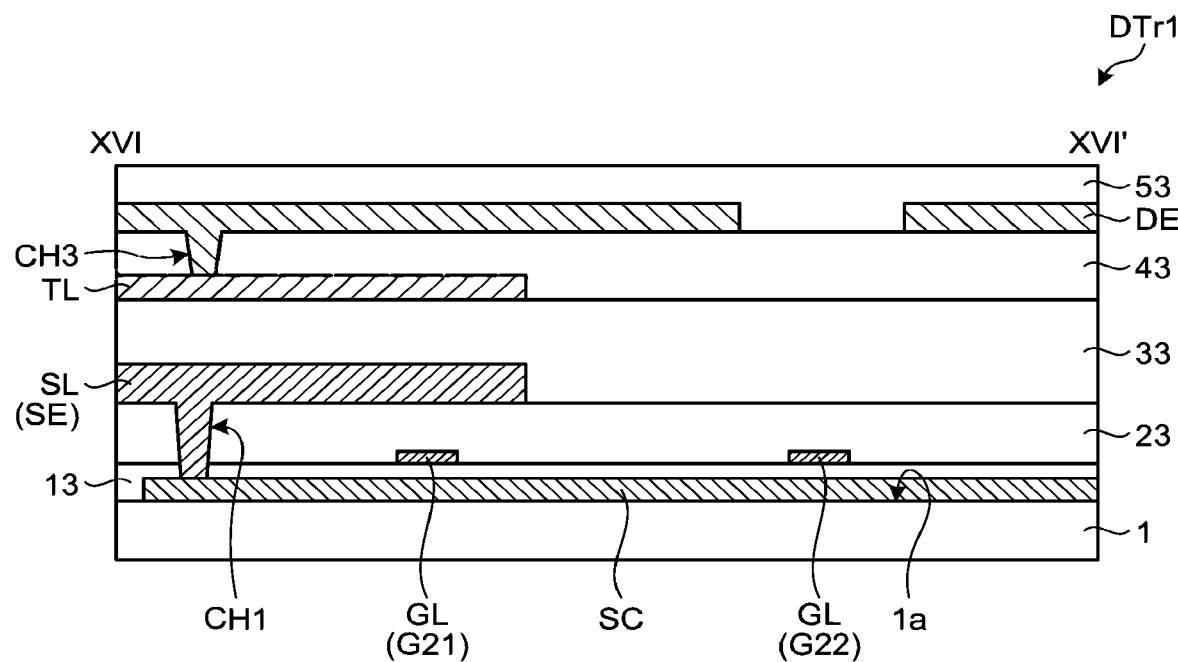
FIG. 16 is a sectional view schematically illustrating a cross-section of the first dummy pixel transistor taken along line XVI-XVI' in FIG. 13.
Figure 17:
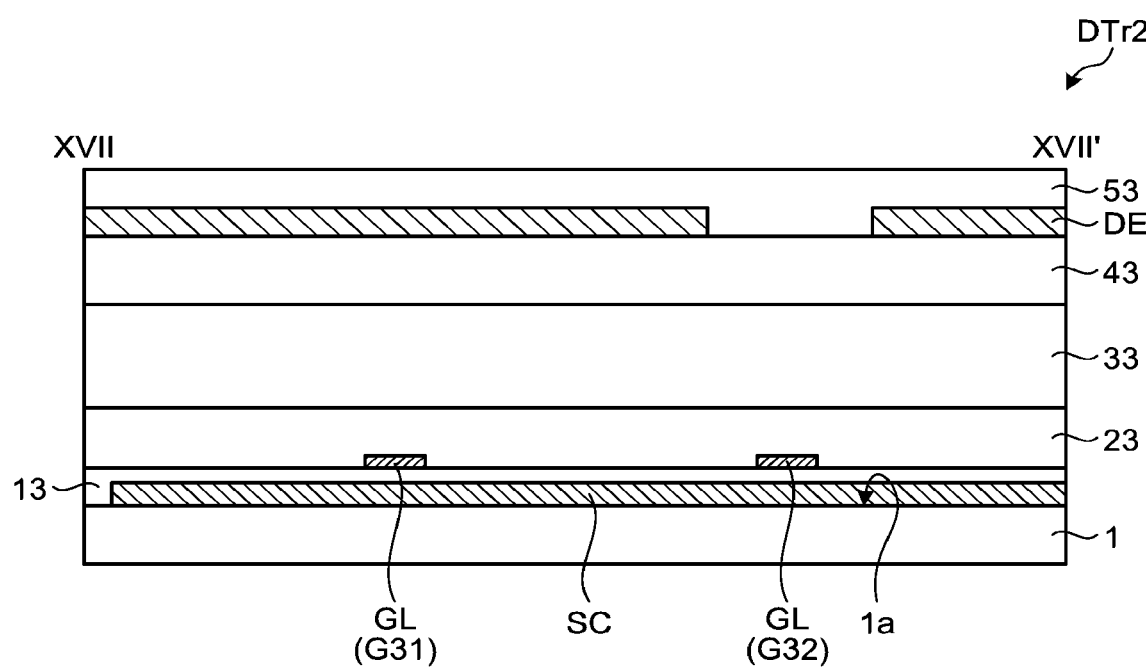
FIG. 17 is a sectional view schematically illustrating a cross-section of the first dummy pixel transistor taken along line XVII-XVII' in FIG. 14.

The following describes each configuration of the first dummy pixel transistor and the second dummy pixel transistor in comparison with the configuration of the pixel transistor Tr (refer to FIG. 2). FIG. 12 is a plan view illustrating a configuration example of the pixel transistor according to the first embodiment. FIG. 13 is a plan view illustrating a configuration example of the first dummy pixel transistor. FIG. 14 is a plan view illustrating a configuration example of the second dummy pixel transistor according to the first embodiment. FIG. 15 is a sectional view schematically illustrating a cross-section of the pixel transistor taken along line XV-XV' in FIG. 12. FIG. 16 is a sectional view schematically illustrating a cross-section of the first dummy pixel transistor taken along line XVI-XVI' in FIG. 13. FIG. 17 is a sectional view schematically illustrating a cross-section of the first dummy pixel transistor taken along line XVII-XVII' in FIG. 14. For avoiding complexity of the figure, FIGS. 12 to 14 do not illustrate part of the layers illustrated in the cross-sections of FIGS. 15 to 17.

As illustrated in FIGS. 12 to 15, in the pixel transistor Tr, the gate line GL arranged on a surface 1a of the base material 1 serves as, for example, a gate electrode G11 and a gate electrode G12. The pixel transistor Tr is, for example, a top-gate type transistor. The gate line GL is formed on the insulating film 13 and is covered with the insulating film 23. The semiconductor film SC is arranged between the insulating film 13 and the base material 1. The signal line SL and the drain SLD are arranged on the inter-layer insulating film 23. The signal line SL is coupled to the semiconductor film SC through the contact hole CH1 arranged in the insulating film 13 and the inter-layer insulating film 23. The drain SLD is coupled to the semiconductor film SC through a contact hole CH2 arranged in the insulating film 13 and the inter-layer insulating film 23. The first planarization film 33 is arranged on the inter-layer insulating film 23. The drain SLD is covered with the first planarization film 33. The detection line TL and the second planarization film 43 are arranged on the first planarization film 33. The detection line TL is covered with the second planarization film 43. The detection electrode DE and an insulating film 53 are arranged on the second planarization film 43. The detection electrode DE is coupled to the detection line TL through the contact hole CH3 arranged in the second planarization film 43. The pixel electrode PE is arranged on the insulating film 53. The pixel electrode PE is coupled to the drain SLD through a contact hole CH4 arranged in the insulating film 53, the second planarization film 43, and the first planarization film 33.

As illustrated in FIG. 13 and FIG. 16, the first dummy pixel transistor DTr1 has a configuration excluding the drain SLD and the pixel electrode PE from the pixel transistor Tr illustrated in FIG. 12 and FIG. 15. The first dummy pixel transistor DTr1 is, for example, also a top-gate type transistor. In the first dummy pixel transistor DTr1, the gate line GL arranged on the surface 1a of the base material 1 serves as a gate electrode G21 and a gate electrode G22. In the first dummy pixel transistor DTr1, the semiconductor film SC is coupled only to the signal line SL, and the potential of the semiconductor film SC is fixed to the potential of the signal line SL.

The width of the semiconductor film SC in the first dummy pixel transistor DTr1 is preferably larger than that in the pixel transistor Tr. In the pixel transistor Tr, the width of the gate electrode G12 at the drain side is, for example, a width W11, as illustrated in FIG. 12. In the pixel transistor Tr, the width W11 is also the width of the semiconductor film SC at the drain side. In the first dummy pixel transistor DTr1, the width of the gate electrode G22 at the drain side is, for example, a width W21, as illustrated in FIG. 13. In the first dummy pixel transistor DTr1, the width W21 is also the width of the semiconductor film SC at the drain side. In the present embodiment, the magnitude relationship of the width W11 and the width W21 is preferably the width W11<the width W21. This configuration can increase parasitic capacitance in the gate line GL coupled to the first dummy pixel transistor DTr1.

The embodiment is not limited to the configuration in which the width of the semiconductor film SC is increased only at the drain side as illustrated in FIG. 13, but may employ a configuration in which the width of the semiconductor film SC overlapping with the gate electrode G21 at the source side is increased. For example, the width of the semiconductor film SC overlapping with the gate electrode G21 at the source side may be identical to the width W21 of the gate electrode G22 at the source side. Further, in order to increase parasitic capacitance, the semiconductor film SC in the first dummy pixel transistor DTr1 is preferably configured to overlap with the gate electrode G22 at the drain side and the gate electrode G21 at the source side, both widths of which are increased as the width W21.

As illustrated in FIG. 14 and FIG. 17, the second dummy pixel transistor DTr2 has a configuration excluding the detection line TL and the signal line SL from the first dummy pixel transistor DTr1 illustrated in FIG. 13 and FIG. 16. The second dummy pixel transistor DTr2 is, for example, also a top-gate type transistor. In the second dummy pixel transistor DTr2, the gate line GL arranged on the surface 1a of the base material 1 serves as a gate electrode G31 and a gate electrode G32. In the second dummy pixel transistor DTr2, the semiconductor film SC is not coupled to anything, and is in an electrically floating state.

A distance between the gate electrode G31 and the gate electrode G32 in the second dummy pixel transistor DTr2 is preferably shorter than a distance between the gate electrode G11 and the gate electrode G12 in the pixel transistor Tr. In the pixel transistor Tr, the distance between the gate electrode G11 and the gate electrode G12 is, for example, a width W12, as illustrated in FIG. 12. In the second dummy pixel transistor DTr2, the distance between the gate electrode G31 and the gate electrode G32 is, for example, a width W32, as illustrated in FIG. 14. In the present embodiment, the magnitude relationship of the width W12 and the width W32 is preferably the width W12>the width W32. This configuration can make it easy to couple more second dummy electrode transistors DTr2 to one gate line GL.

FIG. 12 to FIG. 14 illustrate a case where the pixel transistor Tr, the first dummy pixel transistor DTr1, and the second dummy pixel transistor DTr2 are top-gate type transistors. However, the configuration is merely an example. In the present embodiment, the pixel transistor Tr, the first dummy pixel transistor DTr1, and the second dummy pixel transistor DTr2 may be bottom-gate type transistors. In this case, the gate line GL is located between the semiconductor film SC and the base material 1, and an insulation film is interposed at least between the gate line GL and the semiconductor film SC.

Figure 18:
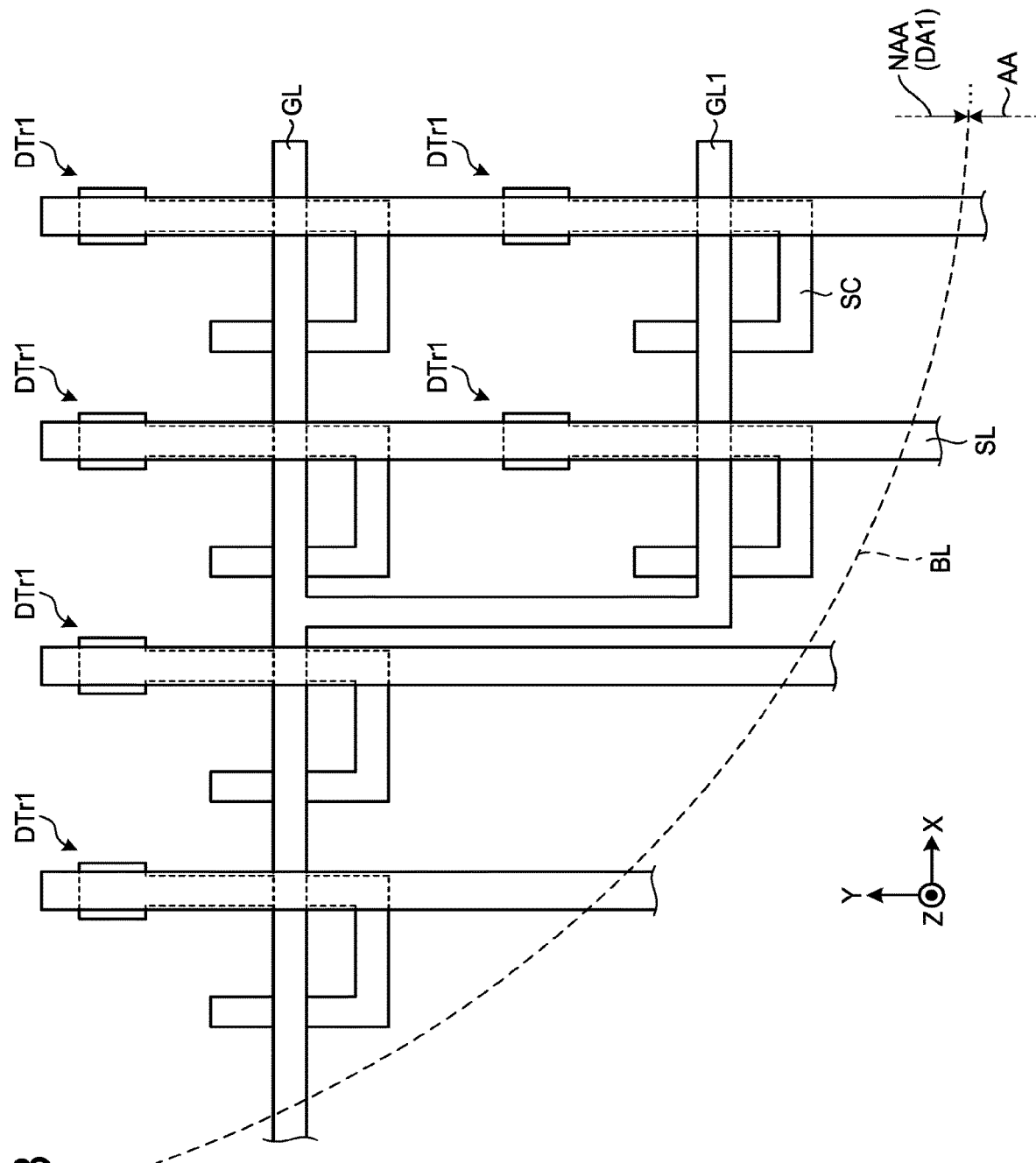
FIG. 18 is a plan view illustrating a coupling example of the first dummy pixel transistor according to the first embodiment.

FIG. 18 is a plan view illustrating a coupling example of the first dummy pixel transistor according to the first embodiment. As illustrated in FIG. 18, a plurality of first dummy pixel transistors DTr1 are coupled to one gate line GL passing through the first dummy pixel region DA1 (refer to FIG. 10 and FIG. 11). This configuration can increase parasitic capacitance in the gate line GL passing through the first dummy pixel region DA1. The larger the number of the first dummy pixel transistors DTr1 is and the larger the width W21 (refer to FIG. 13) is, the higher parasitic capacitance in the gate line GL becomes.

In the present embodiment, the gate line GL passing through the first dummy pixel region DA1 may branch into a plurality of lines. For example, as illustrated in FIG. 18, a branch line GL1 may branch off from the gate line GL passing through the first dummy pixel region DA1. One or more first dummy pixel transistors DTr1 may be coupled to the branch line GL1. This configuration allows more first dummy pixel transistors DTr1 to be coupled to the gate line GL passing through the first dummy pixel region DA1. Further, with this configuration, the first dummy pixel transistors DTr1 can be efficiently arranged in a free space in the first dummy pixel region DA1.

For example, the border line BL between the display region AA and the first dummy pixel region DA1 is formed as a downward-sloping curve, as illustrated in FIG. 18. Accordingly, the first dummy pixel region DA1 illustrated in FIG. 18 becomes larger downward as a position is shifted toward the right side. The branch line GL1 that branches off from the gate line GL extends to the lower side of FIG. 18, and further extends to the right side. With this configuration, the first dummy pixel transistors DTr1 can be arranged in a free space spreading toward the right lower side in the first dummy pixel region DA1.

Figure 19:
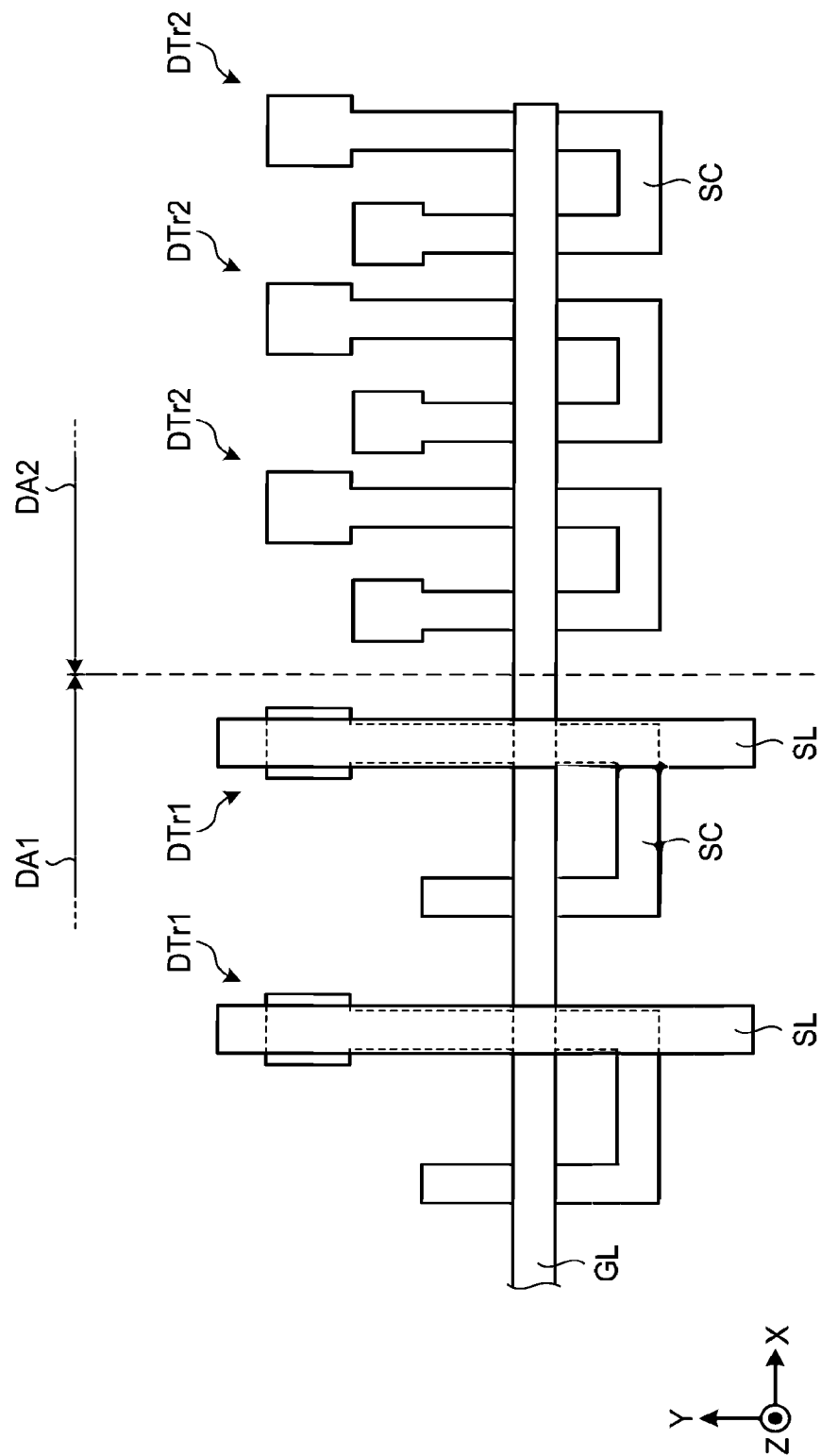
FIG. 19 is a plan view illustrating an example of coupling between the first dummy pixel transistor and the second dummy pixel transistor according to the first embodiment.

FIG. 19 is a plan view illustrating an example of coupling between the first dummy pixel transistor and the second dummy pixel transistor according to the first embodiment. As illustrated in FIG. 19, a plurality of first dummy pixel transistors and a plurality of second dummy pixel transistors are coupled to one gate line GL. As described above, the semiconductor film SC of the second dummy pixel transistor DTr2 is in the electrically floating state. With this configuration, even if ESD occurs in the second dummy pixel transistor DTr2, it is possible to prevent flow of electricity from the second dummy pixel transistor DTr2 to the first dummy pixel transistor DTr1 and the pixel transistor Tr.

As described above, the display device 100 with a sensor according to the first embodiment includes: a substrate (e.g., the first substrate SUB1) including the display region AA and the peripheral region NAA in the periphery of the display region AA; the detection electrodes DE arranged in the display region AA in a matrix (row-column configuration); and the detection lines TL coupled to the respective detection electrodes DE. The shape of the first substrate SUB1 in a plan view includes a curved portion in a plan view (e.g., the notch 5 and the corner 4). The detection electrodes DE include: a first electrode (e.g., the first detection electrode DE1); and a second electrode (e.g., the second detection electrode DE2 or the third detection electrode DE3), the shape of which is different from that of the first electrode in a plan view. The second electrode is juxtaposed with the curved portion. The detection lines TL include: a first line (e.g., the first detection line TL1) coupled to the first electrode; and a second line (e.g., the second detection line TL2 or the third detection line TL3) coupled to the second electrode. The second detection line TL2 (or the third detection line TL3) passes from the display region AA across the peripheral region NAA, and extends to a position overlapping with the second detection electrode DE2 (or the third detection electrode DE3).

This configuration offers greater flexibility in routing the second line with respect to the second electrode, in comparison with a case where the second line extends to a position overlapping with the second electrode in a plan view without exiting from the display region to the peripheral region. For example, the configuration offers greater flexibility in routing the second detection line TL2 (or the third detection line TL3) with respect to the second detection electrode DE2 (or the third detection electrode DE3). This configuration makes it easy to increase the number of contacts between the second detection electrode DE2 (or the third detection electrode DE3) having the irregular shape that is different from the shape of the first detection electrode DE1 and the second detection line TL2 (or the third detection line TL3). It is possible to reduce contact resistance between the second detection electrode DE2 (or the third detection electrode DE3) and the second detection line TL2 (or the third detection line TL3) in accordance with increase in the number of contacts. This configuration can increase a time constant of a sensor (responsiveness of a sensor) with respect to the second detection electrode DE2 (or the third detection electrode DE3) having the irregular shape. As a result, the display device 100 with a sensor exhibiting increased detection performance can be provided.

The second detection line TL2 (or the third detection line TL3) includes: a first linear portion (e.g., the first linear portion TL21 or the first linear portion TL31) located in the display region AA; a second linear portion (e.g., the second linear portion TL22 or the second linear portion TL32) coupled to the first linear portion and located in the peripheral region NAA; a third linear portion (e.g., the third linear portion TL23 or the third linear portion TL33) coupled to the second linear portion and located in the display region AA. In the second detection electrode DE2 (or the third detection electrode DE3), the area of the portion in the display region AA is larger than the area of the portion extending to the peripheral region NAA. This configuration makes it easier to increase the number of contacts between the second detection line TL2 (or the third detection line TL3) and the second detection electrode DE2 (or the third detection electrode DE3).

The first substrate SUB1 includes the notch 5 that is recessed from the edge (e.g., the first side 6a) of the first substrate SUB1 toward the display region AA in a plan view. The notch 5 is the curved portion. This configuration can increase the time constant of a sensor around the notch 5.

The first substrate SUB1 has the corner 4 in a plan view. The corner 4 is the curved portion. This configuration can increase the time constant of a sensor around the corner 4.

The second detection line TL2 (or the third detection line TL3) branches into a plurality of lines to be coupled to the second detection electrode DE2 (or the third detection electrode DE3). This configuration makes it easier to increase the number of contacts between the second detection line TL2 (or the third detection line TL3) and the second detection electrode DE2 (or the third detection electrode DE3).

The display device 100 with a sensor further includes: the pixel transistors Tr arranged in the display region AA; the first dummy pixel transistor DTr1 arranged in the peripheral region NAA; the gate line GL coupling the gate of the pixel transistor Tr and the gate of the first dummy pixel transistor DTr1; the signal line SL coupling the source of the pixel transistor Tr and the source of the first dummy pixel transistor DTr1; and the pixel electrodes PE. The pixel transistors Tr are coupled to the respective pixel electrodes PE. The first dummy pixel transistor DTr1 is not coupled to the pixel electrode PE.

This configuration can increase load (parasitic capacitance) on the gate line GL at a position overlapping with the second detection electrode DE2 (the third detection electrode DE3) in a plan view. This makes parasitic capacitance in the gate line GL overlapping with the second detection electrode DE2 (or the third detection electrode DE3) closer to parasitic capacitance in the gate line GL not overlapping with the second detection electrode DE2 (or the third detection electrode DE3). As a result, a difference in luminance in the display region AA can be reduced.

The width W21 of the gate of the first dummy pixel transistor DTr1 is larger than the width W11 of the gate of the pixel transistor Tr. This configuration can further increase parasitic capacitance in the gate line GL overlapping with the second detection electrode DE2 (or the third detection electrode DE3).

The display device 100 with a sensor further includes the second dummy pixel transistor DTr2 arranged in the peripheral region NAA and between the first pixel transistor DTr1 and the edge 6 of the first substrate SUB1. The gate of the second dummy pixel transistor DTr2 is coupled to the gate line GL. The sources of the second dummy pixel transistor DTr2 is not coupled to anything (i.e., in the electrically floating state). With this configuration, even if ESD occurs in the second dummy pixel transistor DTr2, it is possible to prevent flow of electricity from the second dummy pixel transistor DTr2 to the first dummy pixel transistor DTr1 and the pixel transistor Tr. This is effective as the countermeasure against ESD in the manufacturing process.

The second detection electrode DE2 (or the third detection electrode DE3) overlaps with the second linear portion TL22 (or the second linear portion TL32).

The second detection electrode DE2 (or the third detection electrode DE3) overlaps above the first dummy pixel transistor DTr1 and the second pixel transistor DTr2.

In the first embodiment, the description has been made on the aspect in which the second detection line TL2 (or the third detection line TL3) is coupled to the second detection electrode DE2 (or the third detection electrode DE3) in the display region AA. However, the present embodiment is not limited thereto. In the present embodiment, the second detection line TL2 (or the third detection line TL3) is coupled to the second detection electrode DE2 (or the third detection electrode DE3) in the peripheral region NAA.

Second Embodiment

In the first embodiment, the description has been made on the aspect in which the second detection line TL2 (or the third detection line TL3) passes from the display region AA across the peripheral region NAA in the proximity of the notch 5 (or the corner 4), and is coupled to the second detection electrode DE2 (or the third detection electrode DE3) having the irregular shape. It has been described that with the above configuration, the arrangement order in the Y-axis direction of the detection electrodes DE can be made corresponding to the arrangement order in the X-axis direction of the detection lines TL coupled to the respective detection electrodes DE. However, how the second detection lines TL2 (or the third detection lines TL3) are routed in the peripheral region NAA is not limited to the aspect of the first embodiment.

Figure 20:
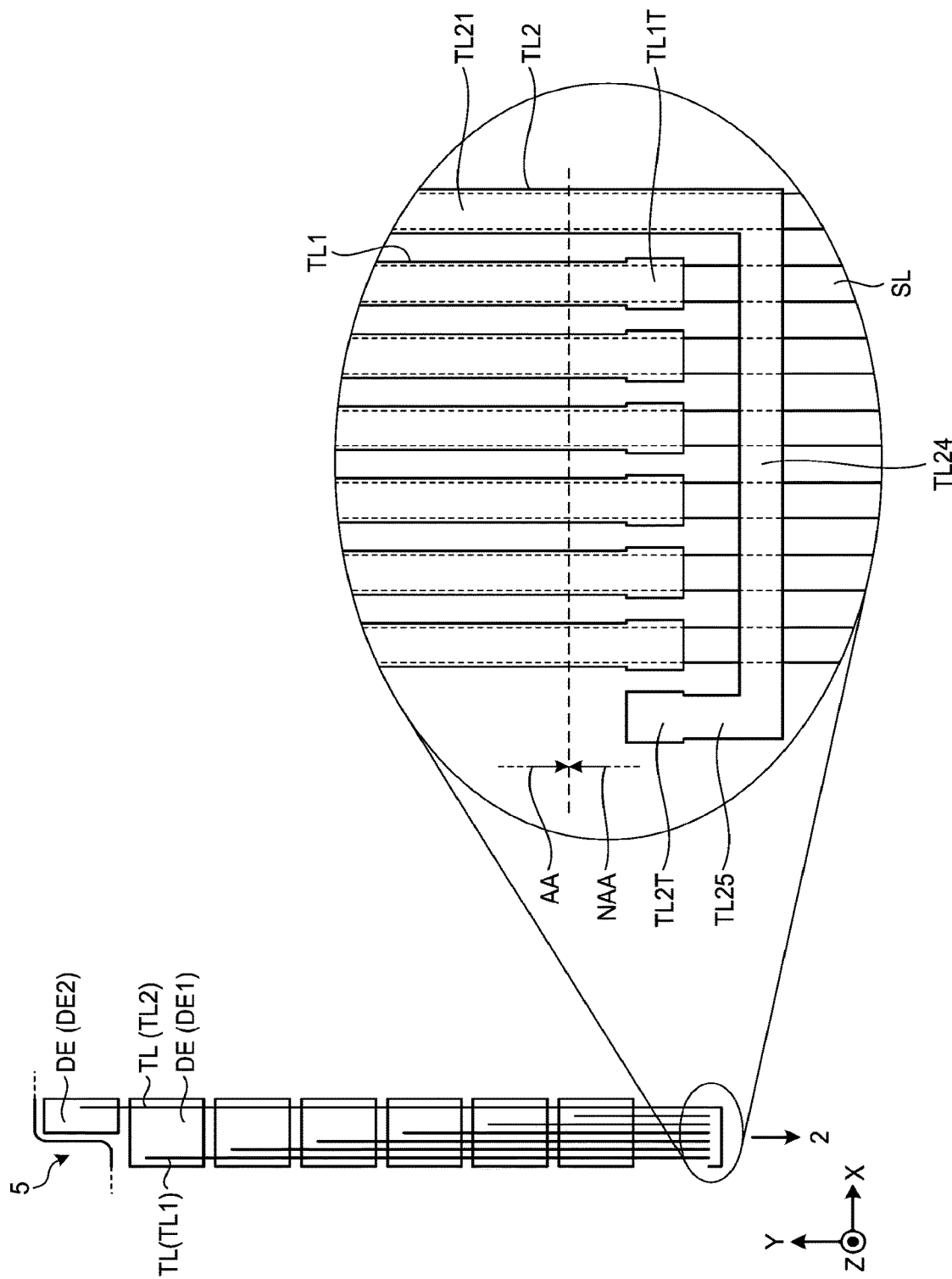
FIG. 20 is a plan view illustrating a routing example of detection lines according to a second embodiment.

FIG. 20 is a plan view illustrating a routing example of the detection lines according to a second embodiment. As illustrated in FIG. 20, the first detection lines TL1 coupled to the respective first detection electrodes DE1 have respective terminals TL1T at the lower end side of the first substrate SUB1 (e.g., at the driver IC 2 side illustrated in FIG. 3). The terminals TL1T are arranged side by side in the X-axis direction. The arrangement order in the X-axis direction of the terminals TL1T corresponds to the arrangement order in the Y-axis direction of the first detection electrodes DE1 coupled to the respective first detection lines TL1.

The second detection line TL2 includes: the first linear portion TL21; a fourth linear portion TL24 coupled to the first linear portion TL21; and a fifth linear portion TL25 coupled to the fourth linear portion TL24. The fourth linear portion TL24 extends in the X-axis direction in the peripheral region NAA at the lower side of the first substrate SUB1. The fourth linear portion TL24 is located between the terminals TL1T arranged side by side in the X-axis direction and the edge 6 at the lower side of the first substrate SUB1. The fourth linear portion TL24 intersects with the signal lines SL in a plan view. The first planarization film 33 (refer to FIG. 4) insulates the fourth linear portion TL24 and the signal lines SL from each other. The fifth linear portion TL25 extends in the Y-axis direction in the peripheral region NAA at the lower side of the first substrate SUB1. The fifth linear portion TL25 is located at the opposite side of the first linear portion TL21 across extended lines of the first detection lines TL1 in a plan view. The tip of the fifth linear portion TL25 is a terminal TL2T of the second detection line TL2. The arrangement order in the X-axis direction of the terminals TL1T and the terminal TL2ZT of the detection lines TL corresponds to the arrangement order in the Y-axis direction of the detection electrodes DE to which the detection lines TL are coupled.

As described above, in the display device 100 with a sensor according to the second embodiment, the second detection line TL2 includes: the first linear portion TL21 juxtaposed with one side of the first detection lines TL1; the fourth linear portion TL24 that is coupled to the first linear portion TL21 and located between the end portions (e.g., the terminals TL1T) of the first detection lines TL1 and the edge 6 of the first substrate SUB1; and the fifth linear portion TL25 juxtaposed with the other side opposite to the one side of the first detection lines TL1, the first linear portion TL21 and the fifth linear portion TL25 interposing the first detection lines TL1 or the extended lines of the first detection lines TL1 therebetween. With this configuration, it becomes easy to make the arrangement order in the Y-axis direction of the second detection electrodes DE2 correspond to the arrangement order in the X-axis direction of the second detection lines TL2 coupled to the respective second detection electrodes DE2.

The aspect illustrated in FIG. 20 may be applied not only to the second detection line TL2, but also to the third detection line TL3. In this case, the second detection line TL2 may be replaced with the third detection line TL3 and the second detection electrodes DE2 may be replaced with the third detection electrodes DE3.

Modification

In the second embodiment, the first detection lines TL1 and the second detection line TL2 (or the third detection line TL3) may extend further to the lower side of the first substrate SUB1 (i.e., the driver IC 2 side) than the positions in the aspect illustrated in FIG. 20. In this case, the first detection lines TL1 and the second detection line TL2 (or the third detection line TL3) may extend to the lower side of the first substrate SUB1 through the use of wiring provided in a different layer as that of the detection lines TL (e.g., wiring arranged in the same layer as that of the signal lines SL). In this case, the signal lines SL may extend to the lower side of the first substrate SUB1 through the use of wiring arranged in the same layer as that of the gate lines GL.

Figure 21:
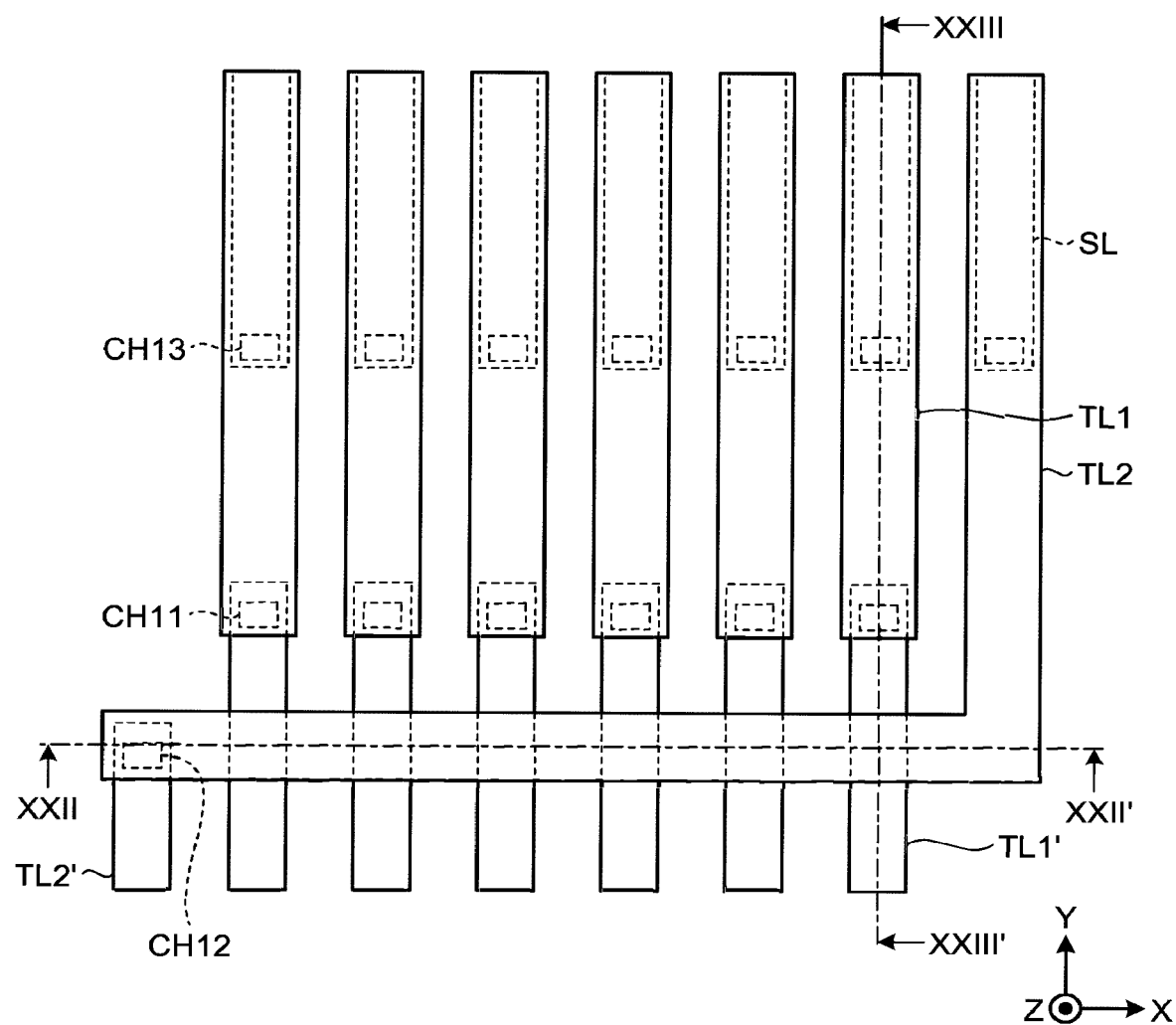
FIG. 21 is a plan view illustrating routing of the detection lines according to a modification of the second embodiment.
Figure 22:
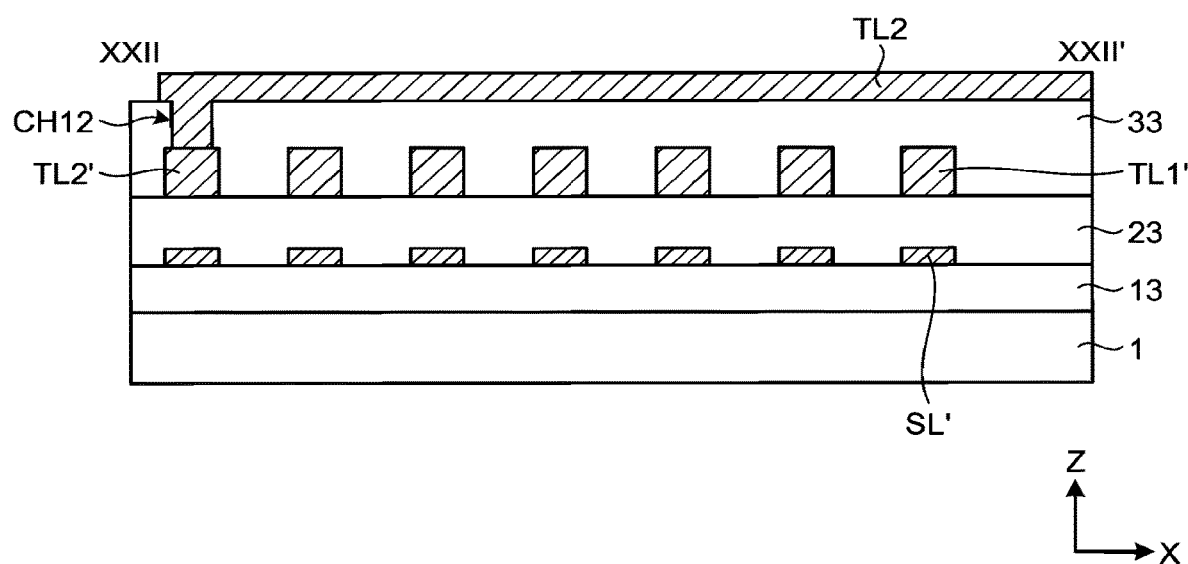
FIG. 22 is a sectional view schematically illustrating a cross-section taken along line XXII-XXII' in FIG. 21.
Figure 23:
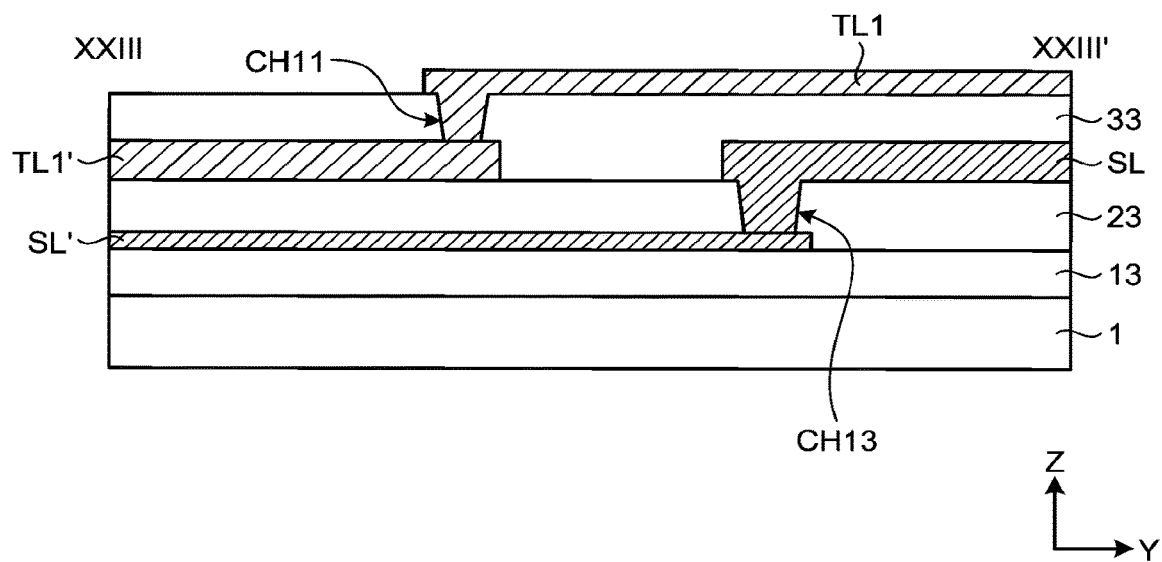
FIG. 23 is a sectional view schematically illustrating a cross-section taken along line XXIII-XXIII' in FIG. 21.

FIG. 21 is a plan view illustrating routing of the detection lines according to a modification of the second embodiment. FIG. 22 is a sectional view schematically illustrating a cross-section taken along line XXII-XXII' in FIG. 21. FIG. 23 is a sectional view schematically illustrating a cross-section taken along line XXIII-XXIII' in FIG. 21. As illustrated in FIGS. 21 to 23, the first detection lines TL1 are coupled to respective first detection lines TL1' through respective contact holes CH11 arranged in the first planarization film 33. The second detection line TL2 is coupled to a second detection line TL2' through a contact hole CH12 provided in the first planarization film 33. The first detection lines TL1' and the second detection line TL2' are, for example, wiring arranged in the same layer as that of the signal lines SL. The first detection line TL1' and the second detection line TL2' are made of the same one type of the material of the signal lines SL (e.g., titanium and aluminum), and have the same thickness as that of the signal lines SL. The first detection lines TL1' and the second detection line TL2' are simultaneously formed in the same process.

The signal lines SL are coupled to respective signal lines SL' through respective contact holes CH13 provided in the interlayer-insulating film 23. The signal lines SL' are, for example, wiring arranged in the same layer as that of the gate lines GL. The signal lines SL' are made of the same one type of the material of the gate lines GL (e.g., titanium and aluminum), and have the same thickness as that of the gate lines GL. The signal lines SL' and the gate lines GL are simultaneously formed in the same process. This configuration allows the first detection lines TL1 and the second detection line TL2 to extend further to the lower side of the first substrate SUB1 without coming into contact with the signal lines SL.

The aspect illustrated in FIGS. 21 to 23 may be applied not only to the second detection line TL2, but also to the third detection line TL3. In this case, the second detection line TL2 is replaced with the third detection line TL3 in FIGS. 21 to 23.

In the first and second embodiments, the signal lines SL are linearly arranged in parallel to the Y-axis direction, as illustrated, for example, in FIG. 12 and FIG. 18. However, this is merely an example and the embodiments are not limited thereto. The signal lines SL may extend, for example, in a zig-zag manner in the Y-axis direction. The detection lines TL arranged at positions overlapping with the signal lines SL in a plan view may extend in a zig-zag manner in the Y-axis direction.

Figure 24:
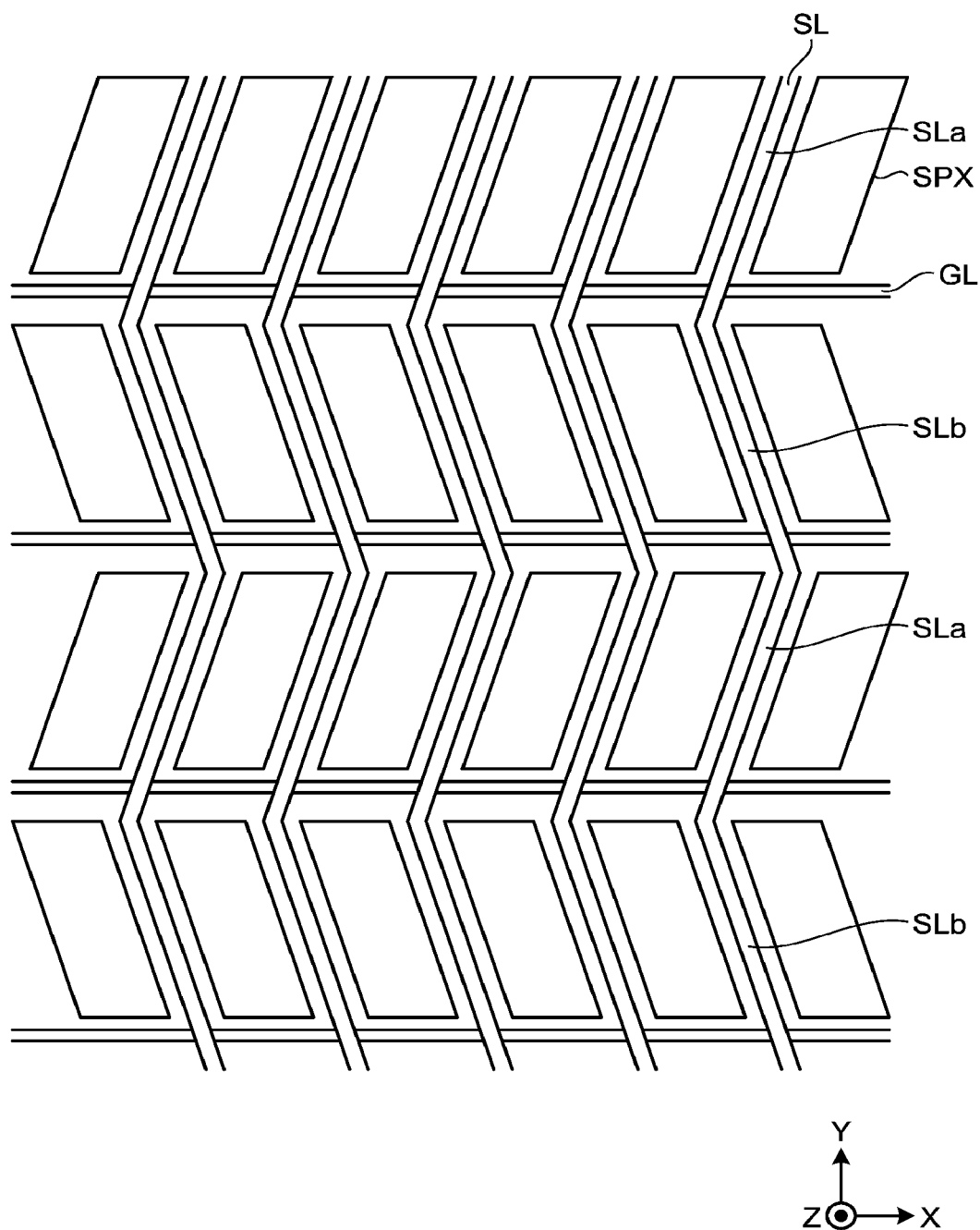
FIG. 24 is a plan view illustrating the shapes of signal lines and sub-pixels according to a modification of the present embodiment.
Figure 25:
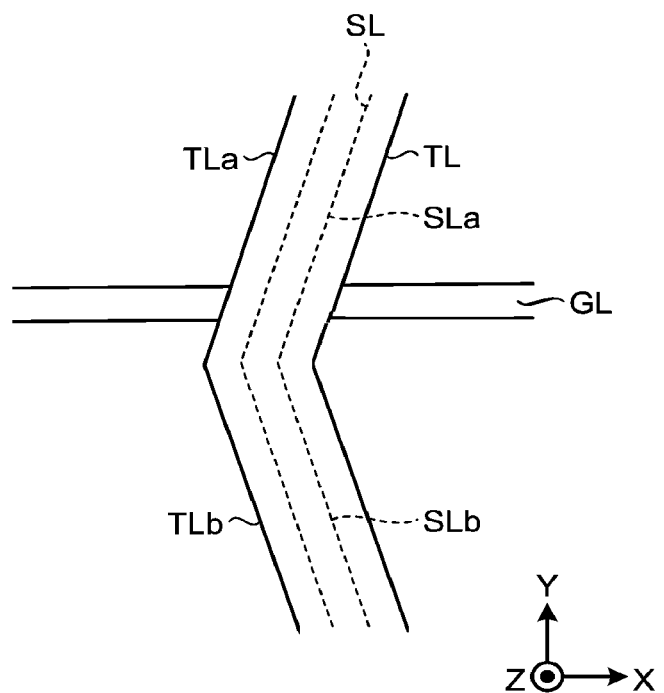
FIG. 25 is a plan view illustrating the shapes of the signal line and the detection line according to the modification of the present embodiment.

FIG. 24 is a plan view illustrating the shapes of the signal lines and the sub-pixels according to a modification of the present embodiment. FIG. 25 is a plan view illustrating the shapes of the signal line and the detection lines according to the modification of the present embodiment. As illustrated in FIG. 24, the sub-pixels SPX may have, for example, a parallelogram shape, or a substantially parallelogram shape. The signal lines SL extend along the sub-pixels SPX.

The signal lines SL extend in a zig-zag manner in the Y-axis direction. The signal line SL, for example, includes: a first linear portion Sla obliquely crossing the Y-axis direction in a plan view; and a second linear portion SLb obliquely crossing both the Y-axis direction and a longitudinal direction of the first linear portion Sla. The signal line SL has a configuration in which the first linear portion Sla and the second linear portion SLb are alternately coupled to each other in series.

As illustrated in FIG. 25, the detection lines TL also extend in a zig-zag manner in the Y-axis direction. The detection line TL, for example, includes: a first linear portion TLa obliquely crossing the Y-axis direction in a plan view; and a second linear portion TLb obliquely crossing both the Y-axis direction and a longitudinal direction of the first linear portion TLa. The detection lines TL each have a configuration in which the first linear portion TLa and the second linear portion TLb are alternately coupled to each other in series. Such a configuration still exhibits the same effects brought by the first and second embodiments.

While the preferred embodiments of the present disclosure have been described, the embodiments are not intended to limit the present disclosure. The contents disclosed in the embodiments are given by way of example only, and various changes may be made without departing from the spirit of the present disclosure. For example, while the detection electrodes and the detection lines are both provided to the first substrate according to the embodiments, they may be provided to the second substrate or may be used for a substrate with an external sensor function (e.g., an external touch panel) in which the detection electrodes and the detection lines are arranged on one surface of the second substrate at the opposite side of the surface facing the first substrate. Appropriate changes made without departing from the spirit of the present disclosure naturally fall within the scope of the disclosure.

What is claimed is:

1. A display device comprising:
   a base substrate;
   a plurality of detection electrodes arranged in a matrix;
   a plurality of pixel electrodes;
   a gate line;
   a pixel transistor overlapping the gate line;
   a first load element overlapping the gate line; and
   a second load element overlapping the gate line,
   wherein
   the base substrate has a curve, in a plan view,
   the detection electrodes include a first detection electrode,
   the second load element is located between the curve of the base substrate and the first load element along the gate line,
   the first load element is located between the second load element and the pixel transistor,
   a semiconductor having a J-shape and intersecting the gate line at two points, is included in each of the pixel transistor, the first load element, and the second load element,
   the pixel transistor is connected to one of the pixel electrodes,
   the first load element is connected to none of the pixel electrodes,
   the second load element is connected to none of the pixel electrodes, and
   the first detection electrode overlaps the pixel transistor, the first load element, and the second load element.

2. The display device according to claim 1, wherein
   the semiconductor having the J-shape has a first line portion and a second line portion,
   the first line portion intersects the gate line,
   the second line portion intersects the gate line, and
   the first line portion is longer than the second line portion.

3. The display device according to claim 2, further comprising a plurality of signal lines including a first signal line and a second signal line,
   wherein
   the first signal line is connected to the first line portion of the pixel electrode,
   the second signal line is connected to the first line portion of the first load element, and
   the semiconductor of the second load element is connected to none of the signal lines.

4. The display device according to claim 2, wherein
   a width of the second line portion of the first load element is greater than a width of the second line portion of the pixel transistor, and
   the width of the second line portion of the first load element is greater than a width of the second line portion of the second load element.

5. The display device according to claim 4, wherein a distance between the first line portion and the second line portion of the pixel transistor is greater than a distance between the first line portion and the second line portion of the second load element.

6. The display device according to claim 4, wherein a distance between the first line portion and the second line portion of the first load element is greater than a distance between the first line portion and the second line portion of the second load element.

7. The display device according to claim 1, wherein
   the first detection electrode has an opening,
   the pixel transistor is connected to the one of the pixel electrodes through the opening,
   the first load element overlaps the opening, and
   the second load element overlaps the opening.

8. The display device of claim 1, further comprising an organic film disposed between the base substrate and the detection electrodes,
   wherein
   the pixel transistor, the first load element and the second load element are disposed between the base substrate and the organic film,
   the organic film has a hole,
   the one of the pixel electrodes is connected to the pixel transistor thorough the hole, the first load element is entirely overlapped by the organic film, and the second load element is entirely overlapped by the organic film.

\* \* \* \* \*